(12) United States Patent
Machesney

(10) Patent No.: US 11,416,116 B2
(45) Date of Patent: Aug. 16, 2022

(54) GENERATION OF MOBILE DEVICE NOTIFICATIONS

(71) Applicant: salesforce.com, inc., San Francisco, CA (US)

(72) Inventor: Sonia Machesney, Dublin (IE)

(73) Assignee: SALESFORCE.COM, INC., San Francisco, CA (US)

( * ) Notice: Subject to any disclaimer, the term of this patent is extended or adjusted under 35 U.S.C. 154(b) by 272 days.

(21) Appl. No.: 15/885,718

(22) Filed: Jan. 31, 2018

(65) Prior Publication Data

US 2019/0235705 A1    Aug. 1, 2019

(51) Int. Cl.
| | | |
|---|---|---|
| *G06F 17/00* | (2019.01) | |
| *G06F 3/0482* | (2013.01) | |
| *G06Q 10/10* | (2012.01) | |
| *H04L 67/306* | (2022.01) | |
| *G06F 3/0483* | (2013.01) | |
| *G06F 3/04847* | (2022.01) | |
| *G06Q 30/06* | (2012.01) | |
| *H04L 67/55* | (2022.01) | |

(52) U.S. Cl.
CPC .......... *G06F 3/0482* (2013.01); *G06F 3/0483* (2013.01); *G06F 3/04847* (2013.01); *G06Q 10/1097* (2013.01); *G06Q 30/0633* (2013.01); *H04L 67/306* (2013.01); *G06Q 30/06* (2013.01); *H04L 67/26* (2013.01)

(58) Field of Classification Search
CPC .. G06F 3/0482; G06F 3/0483; G06F 3/04847; G06Q 10/1097; G06Q 30/0633; H04L 67/306

USPC ................................................ 715/254, 256
See application file for complete search history.

(56) References Cited

U.S. PATENT DOCUMENTS

| | | |
|---|---|---|
| 5,577,188 A | 11/1996 | Zhu |
| 5,608,872 A | 3/1997 | Schwartz et al. |
| 5,649,104 A | 7/1997 | Carleton et al. |
| 5,715,450 A | 2/1998 | Ambrose et al. |
| 5,761,419 A | 6/1998 | Schwartz et al. |
| 5,819,038 A | 10/1998 | Carleton et al. |
| 5,821,937 A | 10/1998 | Tonelli et al. |
| 5,831,610 A | 11/1998 | Tonelli et al. |
| 5,873,096 A | 2/1999 | Lim et al. |
| 5,918,159 A | 6/1999 | Fomukong et al. |
| 5,963,953 A | 10/1999 | Cram et al. |
| 5,983,227 A | 11/1999 | Nazem et al. |
| 6,092,083 A | 7/2000 | Brodersen et al. |
| 6,161,149 A | 12/2000 | Achacoso et al. |
| 6,169,534 B1 | 1/2001 | Raffel et al. |

(Continued)

OTHER PUBLICATIONS

Sarikaya, 'The Technology Behind Personal Digital Assistants', IEEE Signal Processing Magazine, 2017 (Year: 2017).*

(Continued)

*Primary Examiner* — Stephen S Hong
*Assistant Examiner* — Matthew J Ludwig
(74) *Attorney, Agent, or Firm* — Kwan & Olynick, LLP

(57) ABSTRACT

Disclosed are some implementations of systems, apparatus, methods and computer program products for facilitating the generation of mobile device notifications. By processing lists of action items stored on a mobile device and gathering information that is relevant to completing the action items, it is possible to generate mobile device notifications that facilitate the completion of the action items.

20 Claims, 13 Drawing Sheets

240

Today o Buy 3 pin power adapter
o Cut grass
o Drop off dry cleaning
o Buy 60W Soft white globe light bulbs

(56) References Cited

U.S. PATENT DOCUMENTS

| | | |
|---|---|---|
| 6,178,425 B1 | 1/2001 | Brodersen et al. |
| 6,189,011 B1 | 2/2001 | Lim et al. |
| 6,216,133 B1 | 4/2001 | Masthoff |
| 6,216,135 B1 | 4/2001 | Brodersen et al. |
| 6,233,617 B1 | 5/2001 | Rothwein et al. |
| 6,236,978 B1 | 5/2001 | Tuzhilin |
| 6,266,669 B1 | 7/2001 | Brodersen et al. |
| 6,288,717 B1 | 9/2001 | Dunkle |
| 6,295,530 B1 | 9/2001 | Ritchie et al. |
| 6,324,568 B1 | 11/2001 | Diec et al. |
| 6,324,693 B1 | 11/2001 | Brodersen et al. |
| 6,336,137 B1 | 1/2002 | Lee et al. |
| D454,139 S | 3/2002 | Feldcamp et al. |
| 6,367,077 B1 | 4/2002 | Brodersen et al. |
| 6,393,605 B1 | 5/2002 | Loomans |
| 6,405,220 B1 | 6/2002 | Brodersen et al. |
| 6,411,949 B1 | 6/2002 | Schaffer |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec et al. |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans et al. |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,772,229 B1 | 8/2004 | Achacoso et al. |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 6,907,566 B1 | 6/2005 | McElfresh et al. |
| 7,062,502 B1 | 6/2006 | Kesler |
| 7,069,231 B1 | 6/2006 | Cinarkaya et al. |
| 7,069,497 B1 | 6/2006 | Desai |
| 7,100,111 B2 | 8/2006 | McElfresh et al. |
| 7,146,381 B1 * | 12/2006 | Allen .................. G06F 17/2705 |
| 7,181,758 B1 | 2/2007 | Chan |
| 7,269,590 B2 | 9/2007 | Hull et al. |
| 7,289,976 B2 | 10/2007 | Kihneman et al. |
| 7,340,411 B2 | 3/2008 | Cook |
| 7,356,482 B2 | 4/2008 | Frankland et al. |
| 7,373,599 B2 | 5/2008 | McElfresh et al. |
| 7,401,094 B1 | 7/2008 | Kesler |
| 7,406,501 B2 | 7/2008 | Szeto et al. |
| 7,412,455 B2 | 8/2008 | Dillon |
| 7,454,509 B2 | 11/2008 | Boulter et al. |
| 7,508,789 B2 | 3/2009 | Chan |
| 7,599,935 B2 | 10/2009 | La Rotonda et al. |
| 7,603,331 B2 | 10/2009 | Tuzhilin et al. |
| 7,603,483 B2 | 10/2009 | Psounis et al. |
| 7,620,655 B2 | 11/2009 | Larsson et al. |
| 7,644,122 B2 | 1/2010 | Weyer et al. |
| 7,668,861 B2 | 2/2010 | Steven |
| 7,698,160 B2 | 4/2010 | Beaven et al. |
| 7,730,478 B2 | 6/2010 | Weissman |
| 7,747,648 B1 | 6/2010 | Kraft et al. |
| 7,779,039 B2 | 8/2010 | Weissman et al. |
| 7,779,475 B2 | 8/2010 | Jakobson et al. |
| 7,827,208 B2 | 11/2010 | Bosworth et al. |
| 7,853,881 B1 | 12/2010 | Aly Assal et al. |
| 7,945,653 B2 | 5/2011 | Zukerberg et al. |
| 8,005,896 B2 | 8/2011 | Cheah |
| 8,014,943 B2 | 9/2011 | Jakobson |
| 8,015,495 B2 | 9/2011 | Achacoso et al. |
| 8,032,297 B2 | 10/2011 | Jakobson |
| 8,073,850 B1 | 12/2011 | Hubbard et al. |
| 8,082,301 B2 | 12/2011 | Ahlgren et al. |
| 8,086,614 B2 * | 12/2011 | Novy ............... G05B 19/41865 |
| | | 707/723 |
| 8,095,413 B1 | 1/2012 | Beaven |
| 8,095,531 B2 | 1/2012 | Weissman et al. |
| 8,095,594 B2 | 1/2012 | Beaven et al. |
| 8,103,611 B2 | 1/2012 | Tuzhilin et al. |
| 8,150,913 B2 | 4/2012 | Cheah |
| 8,209,308 B2 | 6/2012 | Rueben et al. |
| 8,209,333 B2 | 6/2012 | Hubbard et al. |
| 8,275,836 B2 | 9/2012 | Beaven et al. |
| 8,457,545 B2 | 6/2013 | Chan |
| 8,484,111 B2 | 7/2013 | Frankland et al. |
| 8,490,025 B2 | 7/2013 | Jakobson et al. |
| 8,504,945 B2 | 8/2013 | Jakobson et al. |
| 8,510,045 B2 | 8/2013 | Rueben et al. |
| 8,510,664 B2 | 8/2013 | Rueben et al. |
| 8,566,301 B2 | 10/2013 | Rueben et al. |
| 8,646,103 B2 | 2/2014 | Jakobson et al. |
| 9,195,959 B1 * | 11/2015 | Lopez .................. G06Q 10/087 |
| 9,299,039 B1 * | 3/2016 | Wang ............ G06Q 10/063116 |
| 9,760,559 B2 * | 9/2017 | Dolfing .................. G06F 40/274 |
| 9,842,101 B2 * | 12/2017 | Wang .................. G06F 40/274 |
| 9,946,790 B1 * | 4/2018 | Siegel .................. G06F 16/355 |
| 10,062,042 B1 * | 8/2018 | Kelly ............ G06Q 10/063112 |
| 10,134,488 B1 * | 11/2018 | Bullington ............. G16H 40/20 |
| 10,241,644 B2 * | 3/2019 | Gruber .................. G06F 3/0482 |
| 10,402,061 B2 * | 9/2019 | Kohlmeier ............ G06F 3/0482 |
| 10,635,509 B2 * | 4/2020 | Cho .................... H04L 65/4007 |
| 11,288,321 B1 * | 3/2022 | Rose .................... G06F 3/0482 |
| 2001/0044791 A1 | 11/2001 | Richter et al. |
| 2002/0007309 A1 * | 1/2002 | Reynar ............. G06Q 30/0211 |
| | | 705/14.23 |
| 2002/0035581 A1 * | 3/2002 | Reynar .................. G06Q 30/02 |
| | | 715/205 |
| 2002/0048369 A1 * | 4/2002 | Ginter .................... G06F 21/10 |
| | | 380/277 |
| 2002/0072951 A1 | 6/2002 | Lee et al. |
| 2002/0082892 A1 | 6/2002 | Raffel et al. |
| 2002/0129352 A1 | 9/2002 | Brodersen et al. |
| 2002/0140731 A1 | 10/2002 | Subramaniam et al. |
| 2002/0143997 A1 | 10/2002 | Huang et al. |
| 2002/0162090 A1 | 10/2002 | Parnell et al. |
| 2002/0165742 A1 | 11/2002 | Robbins |
| 2002/0198909 A1 * | 12/2002 | Huynh ................ G06F 17/2785 |
| | | 715/201 |
| 2003/0004971 A1 | 1/2003 | Gong |
| 2003/0018705 A1 | 1/2003 | Chen et al. |
| 2003/0018830 A1 | 1/2003 | Chen et al. |
| 2003/0066031 A1 | 4/2003 | Laane et al. |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec et al. |
| 2003/0189600 A1 | 10/2003 | Gune et al. |
| 2003/0204427 A1 | 10/2003 | Gune et al. |
| 2003/0206192 A1 | 11/2003 | Chen et al. |

(56) References Cited

U.S. PATENT DOCUMENTS

| | | | |
|---|---|---|---|
| 2003/0225730 A1 | 12/2003 | Warner et al. | |
| 2004/0001092 A1 | 1/2004 | Rothwein et al. | |
| 2004/0010489 A1 | 1/2004 | Rio et al. | |
| 2004/0015981 A1 | 1/2004 | Coker et al. | |
| 2004/0027388 A1 | 2/2004 | Berg et al. | |
| 2004/0128001 A1 | 7/2004 | Levin et al. | |
| 2004/0186860 A1 | 9/2004 | Lee et al. | |
| 2004/0193510 A1 | 9/2004 | Catahan et al. | |
| 2004/0199489 A1 | 10/2004 | Barnes-Leon et al. | |
| 2004/0199536 A1 | 10/2004 | Barnes-Leon et al. | |
| 2004/0199543 A1 | 10/2004 | Braud et al. | |
| 2004/0249854 A1 | 12/2004 | Barnes-Leon et al. | |
| 2004/0260534 A1 | 12/2004 | Pak et al. | |
| 2004/0260659 A1 | 12/2004 | Chan et al. | |
| 2004/0268299 A1 | 12/2004 | Lei et al. | |
| 2005/0050555 A1 | 3/2005 | Exley et al. | |
| 2005/0091098 A1 | 4/2005 | Brodersen et al. | |
| 2005/0091118 A1* | 4/2005 | Fano | G06Q 10/109 707/E17.11 |
| 2008/0249972 A1 | 10/2008 | Dillon | |
| 2009/0063415 A1 | 3/2009 | Chatfield et al. | |
| 2009/0100342 A1 | 4/2009 | Jakobson | |
| 2009/0177744 A1 | 7/2009 | Marlow et al. | |
| 2011/0071893 A1* | 3/2011 | Malhotra | G06Q 10/109 705/14.23 |
| 2011/0145823 A1* | 6/2011 | Rowe | G06Q 10/109 718/100 |
| 2011/0218958 A1 | 9/2011 | Warshavsky et al. | |
| 2011/0247051 A1 | 10/2011 | Bulumulla et al. | |
| 2012/0042218 A1 | 2/2012 | Cinarkaya et al. | |
| 2012/0203689 A1* | 8/2012 | Parvis | G06Q 40/00 705/39 |
| 2012/0233137 A1 | 9/2012 | Jakobson et al. | |
| 2012/0290407 A1 | 11/2012 | Hubbard et al. | |
| 2013/0212497 A1 | 8/2013 | Zelenko et al. | |
| 2013/0218948 A1 | 8/2013 | Jakobson | |
| 2013/0218949 A1 | 8/2013 | Jakobson | |
| 2013/0218966 A1 | 8/2013 | Jakobson | |
| 2013/0238463 A1* | 9/2013 | Nishida | G06Q 30/0633 705/26.35 |
| 2013/0247216 A1 | 9/2013 | Cinarkaya et al. | |
| 2014/0089321 A1* | 3/2014 | Engel | G06F 16/9535 707/748 |
| 2014/0122702 A1* | 5/2014 | Jung | H04L 67/22 709/224 |
| 2014/0152577 A1* | 6/2014 | Yuen | H04M 1/72454 345/171 |
| 2014/0359537 A1 | 12/2014 | Jakobson et al. | |
| 2015/0006289 A1 | 1/2015 | Jakobson et al. | |
| 2015/0007050 A1 | 1/2015 | Jakobson et al. | |
| 2015/0095162 A1 | 4/2015 | Jakobson et al. | |
| 2015/0142596 A1 | 5/2015 | Jakobson et al. | |
| 2015/0172563 A1 | 6/2015 | Jakobson et al. | |
| 2015/0242585 A1* | 8/2015 | Spiegel | G16H 10/60 705/2 |
| 2015/0300829 A1* | 10/2015 | Fitzpatrick | H04W 4/02 701/410 |
| 2016/0127539 A1* | 5/2016 | Sharma | H04M 15/08 379/112.09 |
| 2016/0316328 A1* | 10/2016 | Baran | H04W 8/02 |
| 2016/0342694 A1* | 11/2016 | Allen | H04L 67/10 |
| 2017/0004557 A1* | 1/2017 | Glasgow | G06Q 30/0631 |
| 2018/0012195 A1* | 1/2018 | Nagaraj | G06Q 10/10 |
| 2020/0210965 A1* | 7/2020 | Garber | G06N 5/04 |

OTHER PUBLICATIONS

"Google Plus Users", Google+Ripples, Oct. 31, 2011 [retrieved on Feb. 21, 2012 from Internet at http://www.googleplusers.com/google-ripples.html], 3 pages.

* cited by examiner

Dry cleaners located 10 minute drive away. Dry cleaners closes at 6pm. You still have time!

FIGURE 6A

Dry cleaners located 10 minute drive away. Dry cleaners closes at 6pm. You still have time!

View web site

Go to navigation

Set for tomorrow

FIGURE 6B

GENERATION OF MOBILE DEVICE NOTIFICATIONS

COPYRIGHT NOTICE

A portion of the disclosure of this patent document contains material, which is subject to copyright protection. The copyright owner has no objection to the facsimile reproduction by anyone of the patent document or the patent disclosure as it appears in the United States Patent and Trademark Office patent file or records but otherwise reserves all copyright rights whatsoever.

TECHNICAL FIELD

This patent document generally relates to systems and techniques associated with generating mobile device notifications. More specifically, this patent document discloses techniques for using data objects stored on a mobile device to manage mobile device notifications.

BACKGROUND

A variety of applications are available for both personal and professional use. A number of applications enable users to generate and maintain to-do lists on their mobile devices. Users can check off items on these lists as those items are completed. Some of these applications generate reminders for items that have associated deadlines.

BRIEF DESCRIPTION OF THE DRAWINGS

The included drawings are for illustrative purposes and serve only to provide examples of possible structures and operations for the disclosed systems, apparatus, methods and computer program products for leveraging and managing assessment environments in an assessment hub. These drawings in no way limit any changes in form and detail that may be made by one skilled in the art without departing from the spirit and scope of the disclosed implementations.

FIG. 6A shows an example GUI 600 displayed on a client mobile device for providing a list-based notification, in accordance with various implementations.

FIG. 6B shows another example GUI 620 displayed on a client mobile device for providing a list-based notification, in accordance with various implementations.

DETAILED DESCRIPTION

Figure 1:
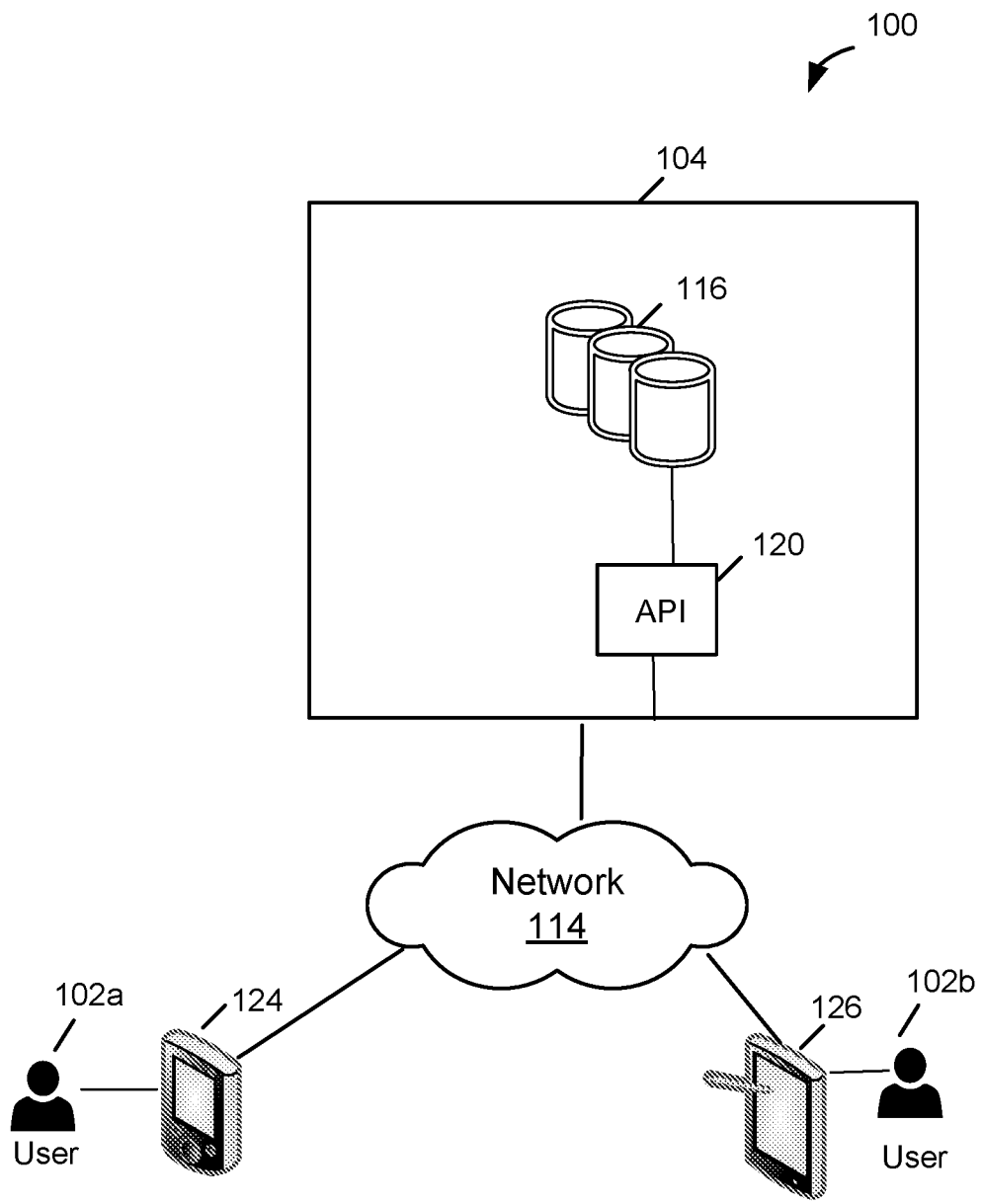
FIG. 1 shows a system diagram of an example of system 100 in which a mobile notification application may be implemented, in accordance with some implementations.

Examples of systems, apparatus, methods and computer program products according to the disclosed implementations are described in this section. These examples are being provided solely to add context and aid in the understanding of the disclosed implementations. It will thus be apparent to one skilled in the art that implementations may be practiced without some or all of these specific details. In other instances, certain operations have not been described in detail to avoid unnecessarily obscuring implementations. Other applications are possible, such that the following examples should not be taken as definitive or limiting either in scope or setting.

In the following detailed description, references are made to the accompanying drawings, which form a part of the description and in which are shown, by way of illustration, specific implementations. Although these implementations are described in sufficient detail to enable one skilled in the art to practice the disclosed implementations, it is understood that these examples are not limiting, such that other implementations may be used and changes may be made without departing from their spirit and scope. For example, the operations of methods shown and described herein are not necessarily performed in the order indicated. It should also be understood that the methods may include more or fewer operations than are indicated. In some implementations, operations described herein as separate operations may be combined. Conversely, what may be described herein as a single operation may be implemented in multiple operations.

Some implementations of the disclosed systems, apparatus, methods and computer program products are configured for generating notifications via a notification application installed on a client device such as a mobile device. The notification application generates notifications pertaining to action items in a list of action items stored on the client device. Notifications that are generated do not merely serve as reminders of action items on the list, but actively facilitate the completion of action items, as will be described in further detail below.

A number of applications facilitate users in the generation of lists of action items, which are often referred to as to-do lists. These applications typically enable a user to actively manage their lists by checking off items on their to-do lists. In addition, many of these applications generate reminders of items having user-specified deadlines. However, these applications do not facilitate the completion of action items on a user's list.

As will be described in further detail below, the disclosed implementations facilitate the completion of action items in a list of action items by generating notifications that pertain to those action items. The notifications can include information that has not been specified by the user and that cannot be directly ascertained from the list of action items. By obtaining relevant information that is current, a notification application can provide this current information to the user to facilitate the successful completion of action items.

By way of illustration, Mary is a busy professional and maintains lists of action items on her mobile device to manage her personal and professional life. She downloads a mobile notification application to facilitate the completion of action items on her lists. Using the mobile notification application, Mary can opt-in or out of notification generation in relation to some or all of her lists. Mary chooses to opt-in to notification generation for her shopping list. The mobile notification application parses her shopping list and sends her notifications that facilitate the completion of action items on her shopping list. For example, the mobile notification application identifies a 60 W light bulb on Mary's shopping list, searches for web sites associated with hardware stores that are within a short distance from Mary's current location, and locates the 60 W light bulb on the web site of one of the hardware stores, Light Bulbs R Us. In addition, the mobile notification application checks the store's stock database and determines that the light bulb is in stock at a Light Bulbs R Us within a mile of Mary's current location. The mobile notification application generates a notification that includes an address of the store and a message that informs Mary that the light bulb is in stock at that location.

It this example, the mobile notification application identifies relevant businesses in the vicinity of the user's current location. In other implementations, the user's residence address, business address, or other default or user-specified address may be accessed by the mobile notification application to generate notifications such as those described herein.

In accordance with various implementations, a mobile notification application can be downloaded from an application store onto a user's mobile device. The mobile notification application monitors one or more lists of action items stored on the user's mobile device and generates notifications pertaining to action items in the lists, as will be described in further detail below.

FIG. 1 shows a system diagram of an example of system 100 in which a mobile notification application may be implemented, in accordance with some implementations. System 100 includes a variety of different hardware and/or software components that are in communication with each other. Communication among components of system 100 may be facilitated through a combination of networks and interfaces. System 100 may handle and process data requests from users 102 of system 100. In the non-limiting example of FIG. 1, system 100 includes an online application store 104 that includes at least one application database 116 and at least one application programming interface (API) 120 that facilitates access to the application database 116. In accordance with various implementations, users may access online application store 104 to download applications stored in the application database 116 onto their mobile devices or other client devices. Application database 116 may be configured for a variety of client devices, platforms, and operating systems. For example, application database 116 may include applications built for iOS or Android devices. In some implementations, a mobile notification application is available in multiple versions compatible with different devices including iOS and Android devices.

Users 102 can access online application store 104 via a network 114. Users 102 can include different users. In this example, user 102a downloads a mobile notification application onto first computing device 124 and user 102b downloads the mobile notification application onto second computing device 126. Examples of devices used by users include, but are not limited to a personal computer (e.g., desktop computer) or portable electronic device (i.e., mobile device) such as a smartphone, a tablet, a laptop, a wearable device such as Google Glass®, another optical head-mounted display (OHMD) device, a smart watch, etc.

Computer-readable instructions for performing the disclosed methods may be downloaded from a web site such as application store 104. The computer-readable instructions may be stored in memory of a computing device such as the first computing device 124 and/or the second computing device 126. In addition, the computer-readable instructions may be stored in a memory that is external to the first computing device 124 and/or the second computing device 126. In some implementations, the computer-readable instructions are implemented in the form of an extension to or integral with an application that facilitates the generation of lists of action items.

In the following description, examples refer to a mobile device. However, it is important to note that these examples are merely illustrative. Therefore, the disclosed implementations may be applied by servers in a cloud computing environment or, alternatively, by any devices on which to-do lists or other lists of action items are generated and maintained.

A user may generate lists of action items for various purposes. Lists of action items may be stored locally on the mobile device or on an external memory device. In some implementations, lists of action items may be stored on a remotely located server in association with a particular user or mobile device. Examples of lists of action items that may be generated by a user are shown and described with reference to FIGS. 2A-2C.

Figure 2A:
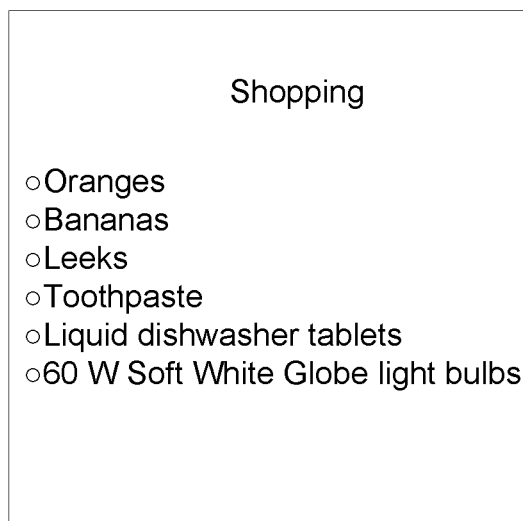
FIG. 2A shows an example of a list 200 of action items displayed on a client mobile device, in accordance with various implementations.

FIG. 2A shows an example of a list 200 of action items displayed on a client mobile device, in accordance with various implementations. In this example, list 200 includes a title, "Shopping," that indicates that list 200 is a shopping list identifying items that the user intends to purchase. Each shopping list item may also be referred to as an action item that identifies an item that the user intends to purchase. A list of action items may include one or more entries, where each entry corresponds to a different action item. In list 200, the user has identified six different items that the user intends to purchase: oranges, bananas, leeks, toothpaste, liquid dishwasher tablets, and 60 W soft white globe light bulbs.

Each action item may include a corresponding set of terms. Individual action items may be distinguished from one another by a symbol that is precedes each action item, such as "-" or "○".

Figure 2B:
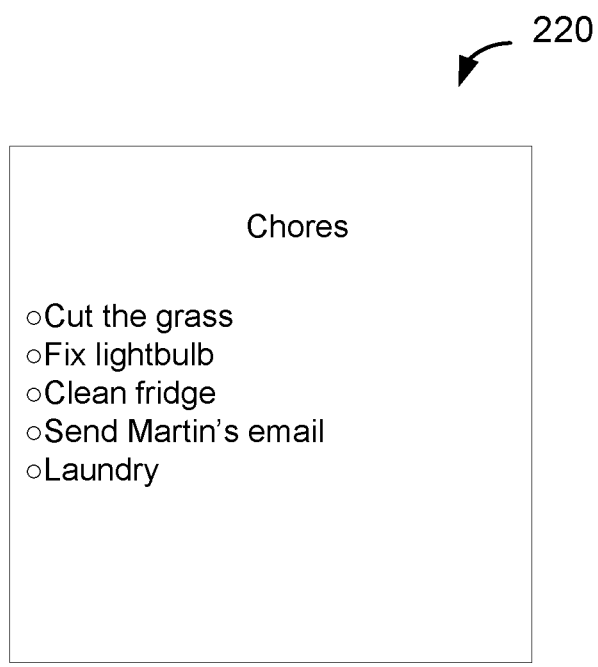
FIG. 2B shows another example of a list 220 of action items displayed on a client mobile device, in accordance with various implementations.

FIG. 2B shows another example of a list 220 of action items displayed on a client mobile device, in accordance with various implementations. In this example, list 220 includes a title, "Chores," that indicates that list 220 a list identifying chores that the user intends to complete. Each chore may also be referred to as an action item that identifies a chore that the user intends to perform. In list 220, the user has identified five different chores that the user intends to complete: cut the grass, fix lightbulb, clean fridge, send Martin's email, and laundry.

Figure 2C:
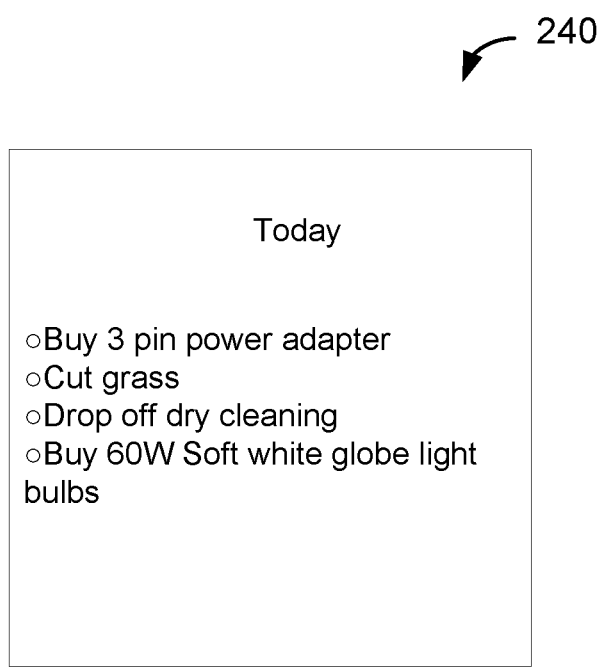
FIG. 2C shows another example of a list 240 of action items displayed on a client mobile device, in accordance with various implementations.

FIG. 2C shows another example of a list 240 of action items displayed on a client mobile device, in accordance with various implementations. In this example, list 240 includes a title, "Today," that indicates that list 240 is a list identifying items that the user intends to complete today. For example, each action item can identify a chore that the user intends to complete today or a shopping list item that the user intends to purchase today. In list 240, the user has identified four different action items that the user intends to complete today: buy 3 pin power adapter, cut the grass, buy 60 W soft white globe light bulbs, and drop off dry cleaning.

In some implementations, the mobile notification application generates notifications for all lists of action items maintained on a user's mobile device. In other implementations, the user may configure the operation of the mobile notification application to generate list-based notifications according to list-based notification configuration settings established by the user. Default or user configurations for list-based notification generations may be stored in a user or device profile, which may be stored locally on the mobile device or externally.

Figure 3A:
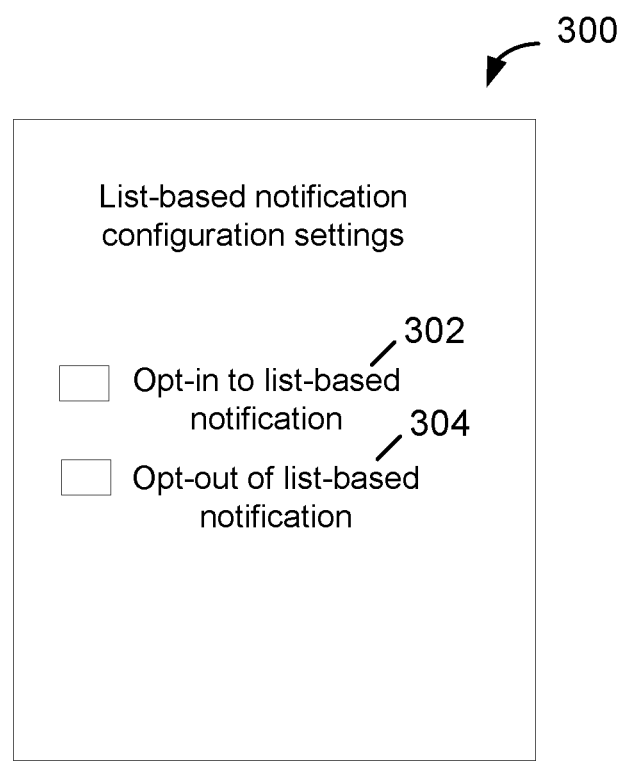
FIG. 3A shows an example graphical user interface (GUI) 300 as displayed on a client mobile device for configuring list-based notification settings, in accordance with various implementations.

FIG. 3A shows an example graphical user interface (GUI) 300 as displayed on a client mobile device, in accordance with various implementations. A user may establish list-based notification configuration settings by opting-in or opting-out of list-based notification. For example, the user may select an opt-in option 302 to opt-in to list-based notification or select an opt-out option 304 to opt-out of list-based notification.

Figure 3B:
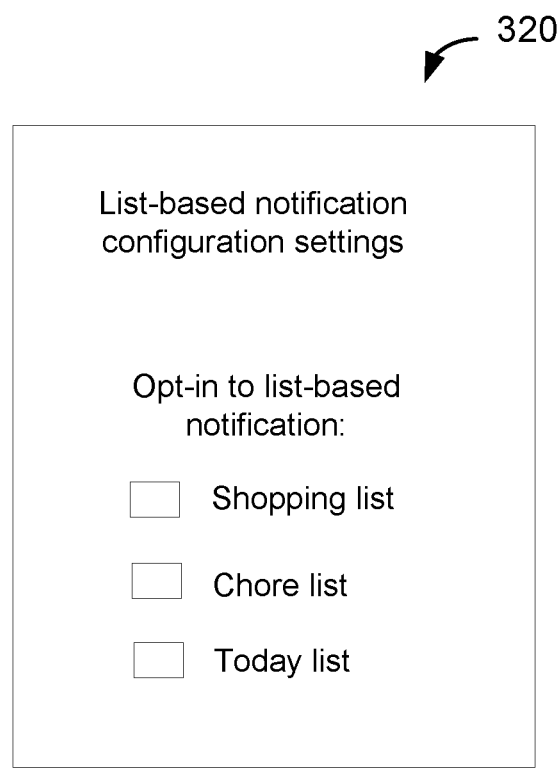
FIG. 3B shows another example GUI 320 as displayed on a client mobile device for configuring list-based notification settings, in accordance with various implementations.

In some implementations, list-based notification settings may be configured on a per-list basis. FIG. 3B shows another example GUI 320 as displayed on a client mobile device, in accordance with various implementations. As shown in this example, a user may opt-in to list-based notification for specific lists on the user's mobile device while opting-out of list-based notification for other lists on the user's mobile device. For example, the user may elect to opt-in to list-based notification for the user's Today list, but may elect not to opt-in to list-based notification for other lists maintained on the user's mobile device.

In the following description, it is assumed that the user has opted-in to list-based notification for the lists described above with reference to FIGS. 2A, 2B, and 2C. Examples of notifications generated by the mobile notification application will be described in further detail below with reference to FIGS. 4A, 4B, 5A, 5B, 6A, and 6B.

The mobile notification application can analyze a list of action items on the user's mobile device and provide notifications based upon a result of the analysis. Analysis of the list of action items can be performed periodically or responsive to a change to the list. The mobile notification application can store results of the analysis of the list of action items to a corresponding data object stored on the mobile device and generate corresponding notifications, as appropriate.

For example, the mobile notification application may analyze the Today list described above with reference to FIG. 2C. Notifications that are generated based upon analysis of the Today list can be provided via user interface elements such as pop-up notifications, banners, drop-down menus, or tabs.

Figure 4A:
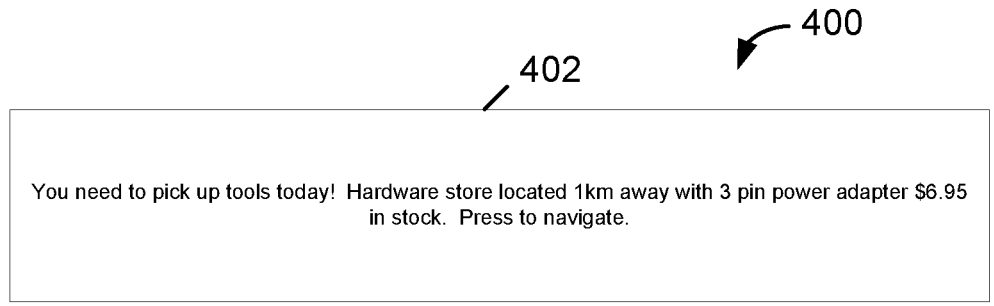
FIG. 4A shows an example GUI 400 displayed on a client mobile device for providing a list-based notification, in accordance with various implementations.

FIG. 4A shows an example GUI 400 displayed on a client mobile device for providing a list-based notification, in accordance with various implementations. The mobile notification application identifies the first entry in the Today list, which indicates that the user intends to "buy 3 pin power adapter." The mobile notification application categorizes the entry and identifies an action term pertaining to the entry. In this example, the action term "buy" is part of the entry. However, in other instances such as where the list is a "Shopping" list such as that described above with reference to FIG. 2A, the action term may be identified within the title of the list. In addition, the mobile notification application may categorize a key word or object within the entry as a particular type of product. For example, the 3 pin power adapter may be categorized as a hardware product. The mobile notification application may identify the list as including items that the user wishes to complete "Today," and generates notifications to facilitate completion of the items today.

The mobile notification application recognizes, based upon the action term "buy," that the user is interested in a store that sells the 3 pin power adapter. Since the item in the list entry is categorized as a hardware product, the mobile notification application may search for nearby stores of type hardware. The mobile notification application may analyze a stock database of the closest hardware store to determine whether the 3 pin power adapter is in stock. If the item is not in stock, the mobile notification application may check the stock database of the next closest hardware store.

Upon identifying a hardware store that has the 3 pin power adapter in stock, the mobile notification application may generate a notification that notifies the user that the list item is in stock at a particular store. The notification may further provide the price of the item.

As shown in FIG. 4A, a user interface element 402 configured to provide the notification is rendered via a display of the mobile device. In this example, user interface element 402 is a banner that pops up on the mobile phone. The banner notifies the user that they need to pick up the 3 pin power adapter today, and indicates that the 3 pin power adapter is in stock at a hardware store located 1 km away and is available for purchase at $6.95. The user may interact with the user interface element 402 to navigate to the hardware store.

Figure 4B:
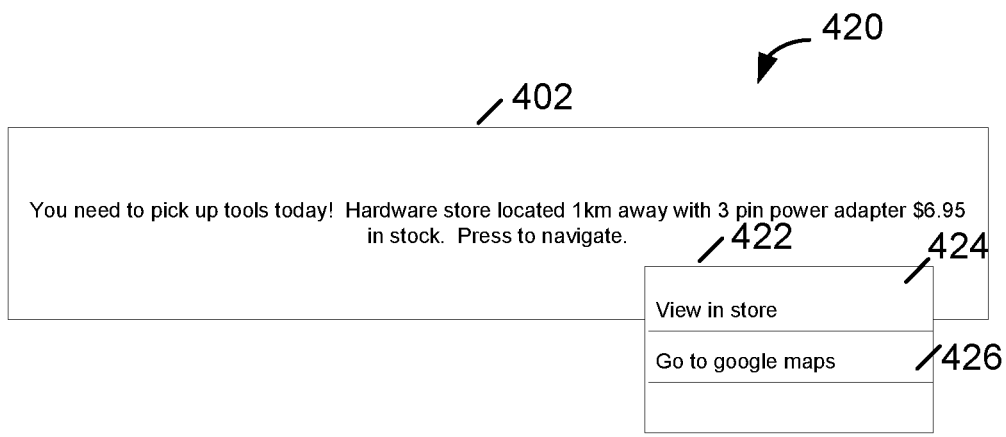
FIG. 4B shows another example GUI 420 displayed on a client mobile device for providing a list-based notification, in accordance with various implementations.

FIG. 4B shows another example GUI 420 displayed on a client mobile device for providing a list-based notification, in accordance with various implementations. In this example, a drop-down menu 422 is rendered in association with the notification of FIG. 4A. For example, the drop-down menu 422 may be rendered responsive to interaction by the user with banner 402. The drop-down menu 422 may be configured to provide a web site associated with the store responsive to the selection of the "View in store" option 424 in the drop-down menu. For example, the mobile notification application may render a web page on which the desired item, the 3 pin power adapter, is displayed. The drop-down menu 422 may be further configured to provide a map and directions to the store responsive to the selection "Go to Google maps."

Figure 5A:
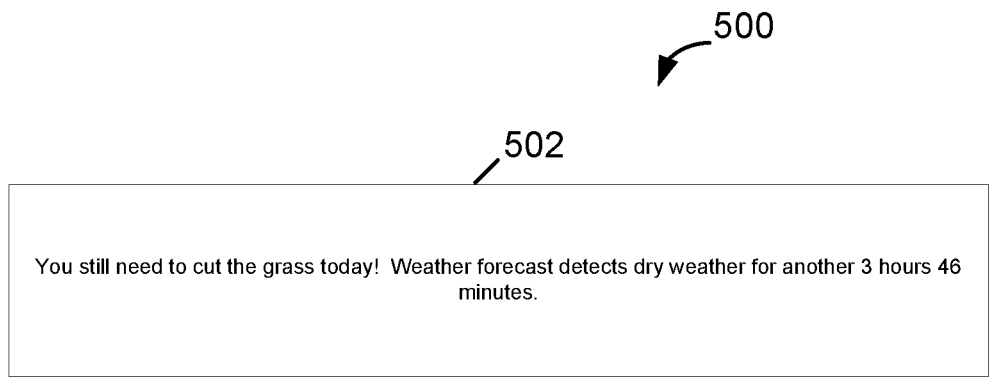
FIG. 5A shows an example GUI 500 displayed on a client mobile device for providing a list-based notification, in accordance with various implementations.

FIG. 5A shows an example GUI 500 displayed on a client mobile device for providing a list-based notification, in accordance with various implementations. The mobile notification application identifies the next entry in the Today list, which indicates that the user intends to "cut grass." The mobile notification application categorizes the entry and identifies an action term pertaining to the entry. In this example, the action term "cut" is identified as a key word within the entry. In addition, the mobile notification application may categorize the entry as an outdoor activity. Since the entry within the Today list is categorized as an outdoor activity, the mobile notification application may ascertain that the weather forecast is pertinent to completion of this particular action item. As set forth above, the mobile notification application may also identify the action item as an item that the user wishes to complete "Today."

The mobile notification application accesses a weather application installed on the mobile device to obtain weather data for the current day. Using the weather data, the mobile notification application may suggest an optimal time to perform the outdoor activity. For example, the mobile notification application may analyze the length of time until rain is expected at the user's current location. The mobile notification application may then generate a notification.

As shown in FIG. 5A, a user interface element 502 configured to provide the notification is rendered via a display of the mobile device. In this example, user interface element 502 is a banner that pops up on the mobile phone. As shown at 502, the notification reminds the user to cut the grass today. In addition, the notification informs the user of the length of time until rain is expected.

Figure 5B:
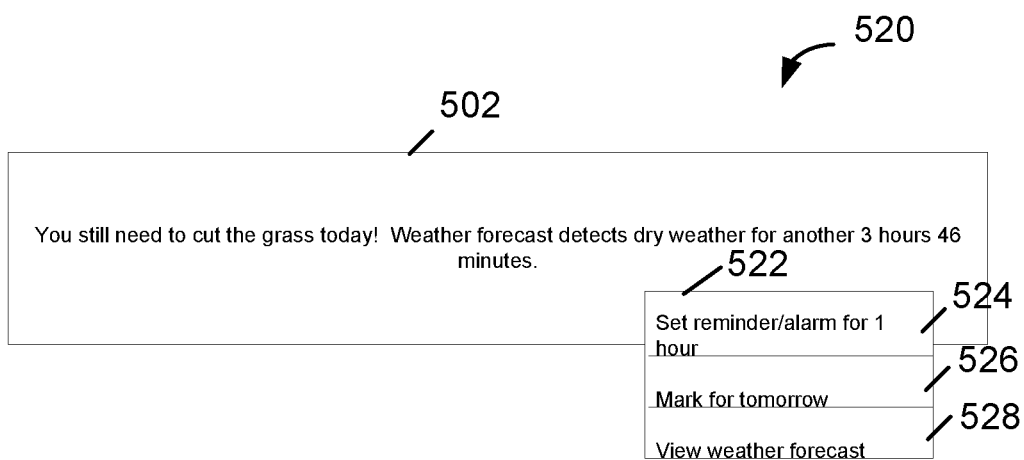
FIG. 5B shows another example GUI 520 displayed on a client mobile device for providing a list-based notification, in accordance with various implementations.

FIG. 5B shows another example GUI 520 displayed on a client mobile device for providing a list-based notification, in accordance with various implementations. In this example, a drop-down menu 522 is rendered in association with the notification of FIG. 5A. For example, the drop-down menu 522 may be rendered responsive to interaction by the user with banner 502. The drop-down menu 522 may be configured to provide several user-selectable options. In this example, a first user-selectable option 524 is configured to set an alarm for a particular time or a delay of a particular time responsive to receiving an indication of a user selection of the first user-selectable option 524. A second user-selectable option 526 is configured to mark the action item for tomorrow responsive to receiving an indication of a user selection of the second user-selectable option 526. A third user-selectable option 528 is configured to access a weather application or associated weather information upon receiving an indication of a user selection of the third user-selectable option 528.

FIG. 6A shows an example GUI 600 displayed on a client mobile device for providing a list-based notification, in accordance with various implementations. The mobile notification application identifies the next entry in the Today list, which indicates that the user intends to "drop off dry cleaning." The mobile notification application categorizes the entry and identifies an action term pertaining to the entry. In this example, the action term "drop" is identified as a key word within text of the entry. In addition, the mobile notification application may categorize the entry as a particular type of service. For example, the action item may be categorized under the category clothing service or clothing maintenance. In addition, the mobile notification application may ascertain from the title of the list that the user wishes to complete this action item today.

The mobile notification application recognizes, based upon the term "drop," that this is an activity that requires that the user travel to a particular location. Since the item in the list entry is categorized as a clothing maintenance, the mobile notification application may identify a corresponding set of operations to be performed. For example, the operations can include searching for nearby locations of dry cleaning services to locate the dry cleaning service that is closest to the user's current location. In addition, the operations can include ascertaining the travel time to the closest dry cleaning service and the closing time of the closest dry cleaning service.

As shown in FIG. 6A, a user interface element 602 configured to provide the notification is rendered via a display of the mobile device. In this example, user interface element 602 is a banner that pops up on the mobile phone. The banner notifies the user that the dry cleaners is located a 10 minute drive away. In addition, the banner notifies the user that the dry cleaners closes at 6 pm.

FIG. 6B shows another example GUI 620 displayed on a client mobile device for providing a list-based notification, in accordance with various implementations. In this example, a drop-down menu 622 is rendered. For example, the drop-down menu 622 may be rendered responsive to interaction by the user with banner 602. The drop-down menu 622 may be further configured to provide a web site associated with the dry cleaners responsive to receiving an indication of selection of the "view web site" option 626. The drop-down menu 622 may be configured to provide directions to the dry cleaners responsive to receiving an indication of selection of the "go to navigation option" 628. In addition, the drop-down menu 622 may be configured to set an alarm for tomorrow responsive to receiving an indication of selection of the option 630.

Figure 7:
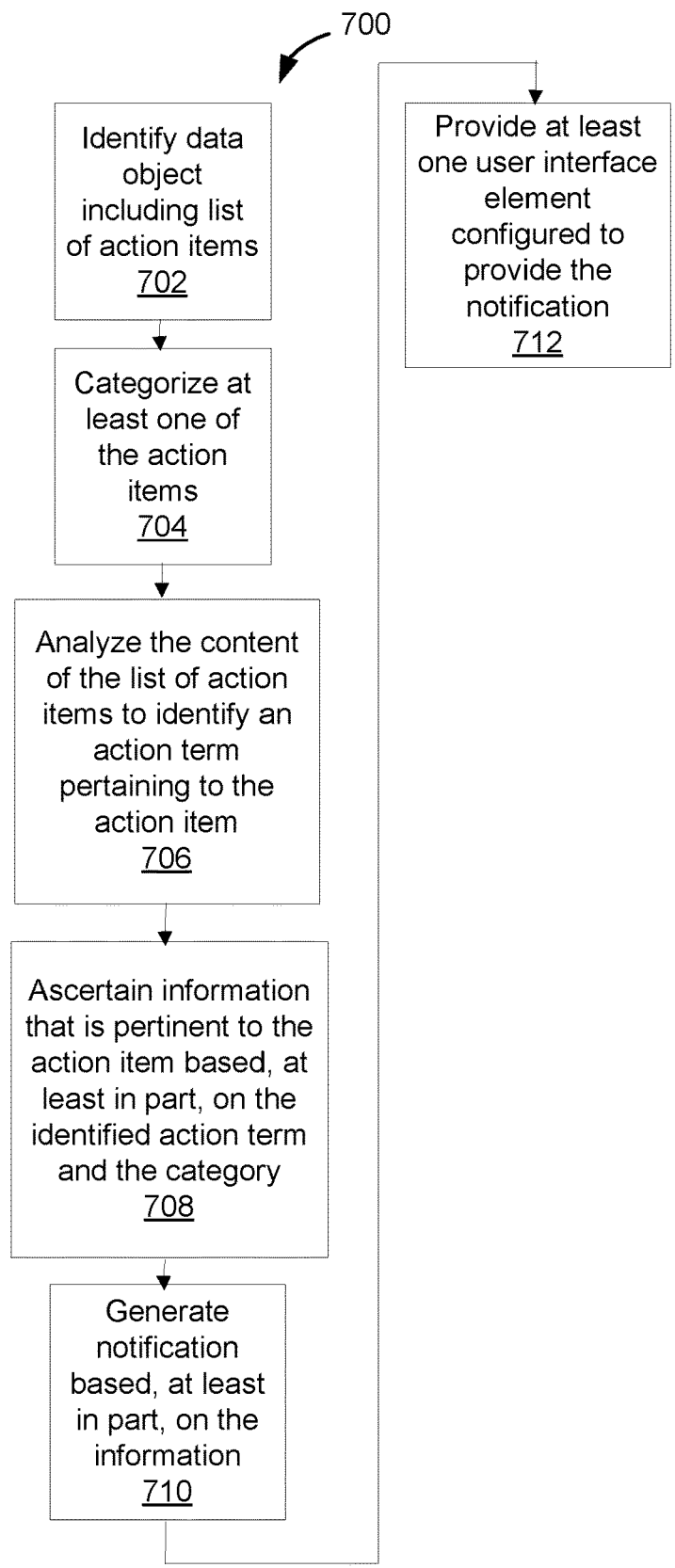
FIG. 7 shows an example of a method for generating mobile device notifications in accordance with some implementations.

FIG. 7 shows an example of a method for generating mobile device notifications in accordance with some implementations. A mobile notification application installed on a mobile device may identify lists of action items that are stored on the mobile device. The mobile notification application may filter these lists to identify those lists of action items that the user has selected for mobile notification generation. For example, the mobile notification application may access a profile associated with the mobile device or user of the mobile device to determine whether the user has opted-in to list-based notification generation. As another example, the mobile notification application may access the profile to determine whether the user has elected to receive mobile notifications for a particular list of action items.

In some implementations, the mobile notification application maintains and updates processing status information on a per-list basis in one or more data objects that are stored on the mobile device. More particularly, the processing status information may include a list status indicator that indicates whether the user wishes to receive mobile notifications for a particular list and/or whether the list has been processed by the mobile notification application. The processing status information may also include a list timestamp indicating a time that the list was most recently processed by the mobile notification application, as described herein.

In some implementations, the processing status information may be maintained on a per-entry basis. More particularly, the processing status information may include a per action item status indicator indicating whether the action item was processed by the mobile notification application. In addition, the processing status information may include a per action timestamp indicating a time that the action item was most recently processed by the mobile notification application, as will be described in further detail below. Processing of an action item may include, but is not limited to, analyzing the action item, generating a mobile notification, transmitting a mobile notification, and/or scheduling a mobile notification or alarm.

In some implementations, the mobile notification application may identify a list of action items that has not been processed by the mobile notification application. For example, the mobile notification application may ascertain from previously stored processing status information whether a particular list has been marked as processed by the mobile notification application.

In some implementations, the mobile notification application may access the stored processing status information to ascertain whether a list of action items has been modified after the list was processed by the mobile notification application. A modified list may be identified, for example, by comparing a first timestamp indicating a time that the list was updated with a second timestamp indicating a time that the list was last processed by the mobile notification application. For a modified list, the mobile notification application may process newly added or modified action items, as described in further detail below.

Monitoring or associated notification generation may be performed periodically according to a period that is statically or dynamically defined. In some implementations, a user may configure the period with which monitoring or notification generation is to be performed by the mobile notification application. For example, the user may indicate a time of day and/or day of the week that monitoring or notification generation is to be performed by the mobile notification application.

Each list of action items may be stored in a corresponding data object. Each data object may include a file or portion thereof. In some implementations, each data object is a data record stored in a database.

The mobile notification application identifies a data object stored on a mobile device at 702, where the data object includes a list of action items. More particularly, the list may include one or more entries, where each of the entries includes a corresponding one of the action items. As described above, a list may also include a title, which can be used in combination with the action items to generate notifications.

The mobile notification application may parse the list of action items to identify at least one key word for each of the action items. In some implementations, the mobile notification application parses the list to categorize the action items within the list and identify an action term for each of the action items, as will be described in further detail below.

The mobile notification application may categorize at least one of the action items in one of a plurality of categories based, at least in part, on content of the list of action items at 704. The content of the list of action items includes the entries and a title of the list of action items (if present). An action item may be categorized based upon key word(s) within the action item and/or the title. For example, where a list entitled "Shopping" includes an entry entitled "3 prong power adapter," the action item may be categorized as a hardware product based upon a look up of text within the entry. As another example, where a list entitled "Chores" includes an entry entitled "fix washing machine," the action item may be categorized as a home appliance based upon key words within the entry. Key words may be identified as an object of a verb within the entry or a subject of the entry.

The categories may be statically defined or dynamically generated. A category may correspond to a type of action item. For example, a category may indicate a type of product, a type of service, or a location where the action item is to be performed (e.g., outdoors vs indoors). In some implementations, each of the categories may correspond to a particular set of operations that are to be performed by the mobile notification application. For example, an "outdoor" category may trigger the notification application to check the weather for the pertinent day.

The mobile notification application may further analyze the content of the list of action items to identify an action term pertaining to the action item in the list of action items at 706. The action term may be ascertained from the action item and/or the title. Typically, the action term will include a verb. For example, the action term pertaining to the 3 prong adapter in the example described above may be ascertained from text within the title, "Shopping." From this action term, the mobile notification application ascertains that the user intends to purchase the corresponding item. As another example, the action term pertaining to the "fix washing machine" list entry may be ascertained from text within the list entry/action item. More particularly, the mobile notification application may identify the verb "fix" as the action term. From this action term, the mobile notification application ascertains that the user intends to repair the corresponding item.

The mobile notification application may ascertain information that is pertinent to the action item based, at least in part, on the identified action term and the category in which the action item is categorized at 708. For example, information pertaining to fixing a washing machine may be ascertained based, at least in part, upon the key word "washing machine," the action term "fix," and the category "home appliance."

In some implementations, the mobile notification application identifies a set of operations that correspond to the identified key word(s), action term, and category. The mobile notification application then performs these operations to generate a corresponding notification. These operations can include information gathering operations that govern the manner in which information is gathered and the types of information that is gathered. Some of these operations may be conditional on the outcome of other operations. For example, where the mobile notification application checks the weather for a particular day, the next operation that is performed may depend upon the type of weather that is predicted.

Information that is ascertained may include, but is not limited to, a web page, a web site, data gathered from a web page or web site, data gathered from an external database associated with a web site, and/or data gathered from an application installed on the mobile device. An external database can include, for example, a stock database of an online store, where the stock database indicates those products that are in stock, the locations of stores in which the products can be purchased, and/or the number of product items in stock at the various locations. The information can consist of a single piece of information or can include multiple portions.

The mobile notification application may store results of processing the list of action items in one or more data objects. More particularly, the mobile notification application may store results of parsing the list, categorization of action items within the list, action term(s) for action items within the list, key words of action items within the list, data used to generate notifications, scheduling information for scheduled notifications, user responses to notifications, and/or any other information that has been ascertained in association with the list.

The mobile notification application may generate a notification based, at least in part, on the information at 710. For example, the mobile notification application may generate text of the notification based, at least in part, on the information. In addition, the mobile notification application may select and/or generate at least one user interface element for display at the mobile device. In some implementations, different types of user interface elements or user-selectable options are provided in relation to corresponding types of information. In addition, different types of user interface elements or user-selectable options may be provided in relation to corresponding key word/action term/category combinations.

The mobile notification application may provide at least one user interface element for display at the mobile device at 712, where the user interface element is configured to provide the notification. A user interface element can be configured to display the notification such that the information or portion thereof is visible to the user without any further input from the user. Alternatively, a user interface element can be configured to provide at least a portion of the information responsive to user interaction with the corresponding user interface element. For example, the mobile notification application may provide a banner or pop-up notification. As another example, the mobile notification application may provide a drop-down menu or tabs with which a user may interact to view or access corresponding segments of the notification.

In addition to providing useful information, one or more user interface elements of the notification may enable the user to access services such as setting reminders. For example, a user interface element may correspond to a user-selectable option for setting an alarm for a pre-defined period of time.

Segments of the notification may trigger the mobile notification application to provide different portions of the information and/or provide different services responsive to user selection of the various segments. For example, the segments may correspond to different user-selectable options to set further alarms or reminders in association with corresponding action items, obtain directions, or access a corresponding web site.

The above-described method describes an example process for notification generation corresponding to a single entry of a list of action items. This method may be repeated for remaining entries in the list of action items. In addition, the method may be repeated for further lists stored on the mobile device.

After an item in the list has been successfully processed by the mobile notification application, the item may be marked as completed by the mobile notification application. Upon successful processing of the list by the mobile notification application, the list may be marked as completed by the mobile notification application. In some implementations, the mobile notification application monitors for updates to the list and generates new notifications for added action items or modified action items, as appropriate.

In some instances, the mobile notification application may determine that it will not generate a notification for a particular action item or list. For example, the mobile notification application may ascertain that it cannot identify an action term for an action item or properly categorize an action item. As another example, the mobile notification application may be unable to identify information that would be useful in facilitating the completion of the action item by a user. In these instances, the mobile notification application may mark the action item or list as completed, as appropriate.

In the above-described implementations, notifications are generated by a mobile notification application installed on the mobile device in relation to lists of action items stored on the mobile device. However, it is important to note that these examples are merely illustrative. Therefore, notifications may also be generated by a mobile notification application executing on a remotely located server in relation to lists of action items, which may be stored on the mobile device or external to the mobile device.

In some but not all implementations, the disclosed methods, apparatus, systems, and computer program products may be configured or designed for use in a multi-tenant database environment. For example, a web page rendered by a browser at a user's client device may include data maintained by a multi-tenant database system. The term "multi-tenant database system" generally refers to those systems in which various elements of hardware and/or software of a database system may be shared by one or more customers. For example, a given application server may simultaneously process requests for a great number of customers, and a given database table may store records, which include rows of data, for a potentially much greater number of customers.

In some implementations, user profiles may be maintained in association with users of the system. An example of a "user profile" or "user's profile" is a database object or set of objects configured to store and maintain data about a given user of a social networking system and/or database system. The data can include general information, such as name, title, phone number, a photo, a biographical summary, and a status, e.g., text describing what the user is currently doing. Where there are multiple tenants, a user is typically associated with a particular tenant. For example, a user could be a salesperson of a company, which is a tenant of the database system that provides a database service.

The term "record" generally refers to a data entity having fields with values and stored in database system. An example of a record is an instance of a data object created by a user of the database service, for example, in the form of a CRM record about a particular (actual or potential) business relationship or project. The record can have a data structure defined by the database service (a standard object) or defined by a user (custom object). For example, a record can be for a business partner or potential business partner (e.g., a client, vendor, distributor, etc.) of the user, and can include information describing an entire company, subsidiaries, or contacts at the company. As another example, a record can be a project that the user is working on, such as an opportunity (e.g., a possible sale) with an existing partner, or a project that the user is trying to get. In one implementation of a multi-tenant database system, each record for the tenants has a unique identifier stored in a common table. A record has data fields that are defined by the structure of the object (e.g., fields of certain data types and purposes). A record can also have custom fields defined by a user. A field can be another record or include links thereto, thereby providing a parent-child relationship between the records.

Figure 8A:
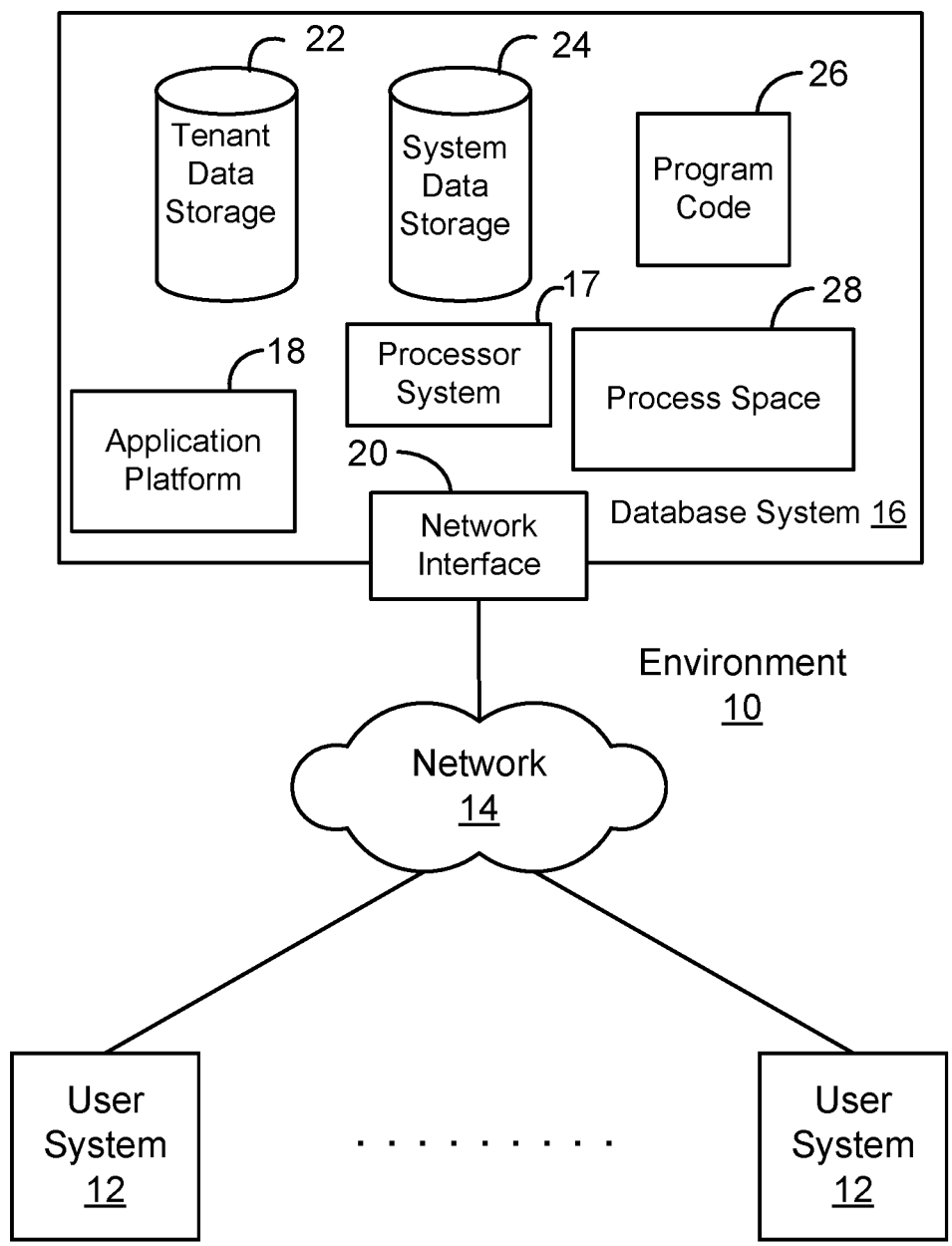
FIG. 8A shows a block diagram of an example of an environment 10 in which an on-demand database service can be used in accordance with some implementations.

Some non-limiting examples of systems, apparatus, and methods are described below for implementing database systems and enterprise level networking systems in conjunction with the disclosed techniques. FIG. 8A shows a block diagram of an example of an environment 10 in which an on-demand database service exists and can be used in accordance with some implementations. Environment 10 may include user systems 12, network 14, database system 16, processor system 17, application platform 18, network interface 20, tenant data storage 22, system data storage 24, program code 26, and process space 28. In other implementations, environment 10 may not have all of these components and/or may have other components instead of, or in addition to, those listed above.

A user system 12 may be implemented as any computing device(s) or other data processing apparatus such as a machine or system used by a user to access a database system 16. For example, any of user systems 12 can be a handheld and/or portable computing device such as a mobile phone, a smartphone, a laptop computer, or a tablet. Other examples of a user system include computing devices such as a personal computer, work station and/or a network of computing devices. As illustrated in FIG. 8A (and in more detail in FIG. 8B) user systems 12 might interact via a network 14 with an on-demand database service, which is implemented in the example of FIG. 8A as database system 16.

An on-demand database service, implemented using system 16 by way of example, is a service that is made available to users who do not need to necessarily be concerned with building and/or maintaining the database system. Instead, the database system may be available for their use when the users need the database system, i.e., on the demand of the users. Some on-demand database services may store information from one or more tenants into tables of a common database image to form a multi-tenant database system (MTS). A database image may include one or more database objects. A relational database management system (RDBMS) or the equivalent may execute storage and retrieval of information against the database object(s). Application platform 18 may be a framework that allows the applications of system 16 to run, such as the hardware and/or software, e.g., the operating system. In some implementations, application platform 18 enables creation, managing and executing one or more applications developed by the provider of the on-demand database service, users accessing the on-demand database service via user systems 12, or third party application developers accessing the on-demand database service via user systems 12.

The users of user systems 12 may differ in their respective capacities, and the capacity of a particular user system 12 might be entirely determined by permissions (permission levels) for the current user. For example, when a salesperson is using a particular user system 12 to interact with system 16, the user system has the capacities allotted to that salesperson. However, while an administrator is using that user system to interact with system 16, that user system has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level, also called authorization.

Network 14 is any network or combination of networks of devices that communicate with one another. For example, network 14 can be any one or any combination of a LAN (local area network), WAN (wide area network), telephone network, wireless network, point-to-point network, star network, token ring network, hub network, or other appropriate configuration. Network 14 can include a TCP/IP (Transfer Control Protocol and Internet Protocol) network, such as the global internetwork of networks often referred to as the Internet. The Internet will be used in many of the examples herein. However, it should be understood that the networks that the present implementations might use are not so limited.

User systems 12 might communicate with system 16 using TCP/IP and, at a higher network level, use other common Internet protocols to communicate, such as HTTP, FTP, AFS, WAP, etc. In an example where HTTP is used, user system 12 might include an HTTP client commonly referred to as a "browser" for sending and receiving HTTP signals to and from an HTTP server at system 16. Such an HTTP server might be implemented as the sole network interface 20 between system 16 and network 14, but other techniques might be used as well or instead. In some implementations, the network interface 20 between system 16 and network 14 includes load sharing functionality, such as round-robin HTTP request distributors to balance loads and distribute incoming HTTP requests evenly over a plurality of servers. At least for users accessing system 16, each of the plurality of servers has access to the MTS' data; however, other alternative configurations may be used instead.

In one implementation, system 16, shown in FIG. 8A, implements a web-based CRM system. For example, in one implementation, system 16 includes application servers configured to implement and execute CRM software applications as well as provide related data, code, forms, web pages and other information to and from user systems 12 and to store to, and retrieve from, a database system related data, objects, and Webpage content. With a multi-tenant system, data for multiple tenants may be stored in the same physical database object in tenant data storage 22, however, tenant data typically is arranged in the storage medium(s) of tenant data storage 22 so that data of one tenant is kept logically separate from that of other tenants so that one tenant does not have access to another tenant's data, unless such data is expressly shared. In certain implementations, system 16 implements applications other than, or in addition to, a CRM application. For example, system 16 may provide tenant access to multiple hosted (standard and custom) applications, including a CRM application. User (or third party developer) applications, which may or may not include CRM, may be supported by the application platform 18, which manages creation, storage of the applications into one or more database objects and executing of the applications in a virtual machine in the process space of the system 16.

One arrangement for elements of system 16 is shown in FIGS. 7A and 7B, including a network interface 20, application platform 18, tenant data storage 22 for tenant data 23, system data storage 24 for system data 25 accessible to system 16 and possibly multiple tenants, program code 26 for implementing various functions of system 16, and a process space 28 for executing MTS system processes and tenant-specific processes, such as running applications as part of an application hosting service. Additional processes that may execute on system 16 include database indexing processes.

Several elements in the system shown in FIG. 8A include conventional, well-known elements that are explained only briefly here. For example, each user system 12 could include a desktop personal computer, workstation, laptop, PDA, cell phone, or any wireless access protocol (WAP) enabled device or any other computing device capable of interfacing directly or indirectly to the Internet or other network connection. The term "computing device" is also referred to herein simply as a "computer". User system 12 typically runs an HTTP client, e.g., a browsing program, such as Microsoft's Internet Explorer browser, Netscape's Navigator browser, Opera's browser, or a WAP-enabled browser in the case of a cell phone, PDA or other wireless device, or the like, allowing a user (e.g., subscriber of the multi-tenant database system) of user system 12 to access, process and view information, pages and applications available to it from system 16 over network 14. Each user system 12 also typically includes one or more user input devices, such as a keyboard, a mouse, trackball, touch pad, touch screen, pen or the like, for interacting with a GUI provided by the browser on a display (e.g., a monitor screen, LCD display, OLED display, etc.) of the computing device in conjunction with pages, forms, applications and other information provided by system 16 or other systems or servers. Thus, "display device" as used herein can refer to a display of a computer system such as a monitor or touch-screen display, and can refer to any computing device having display capabilities such as a desktop computer, laptop, tablet, smartphone, a television set-top box, or wearable device such Google Glass® or other human body-mounted display apparatus. For example, the display device can be used to access data and applications hosted by system 16, and to perform searches on stored data, and otherwise allow a user to interact with various GUI pages that may be presented to a user. As discussed above, implementations are suitable for use with the Internet, although other networks can be used instead of or in addition to the Internet, such as an intranet, an extranet, a virtual private network (VPN), a non-TCP/IP based network, any LAN or WAN or the like.

According to one implementation, each user system 12 and all of its components are operator configurable using applications, such as a browser, including computer code run using a central processing unit such as an Intel Pentium® processor or the like. Similarly, system 16 (and additional instances of an MTS, where more than one is present) and all of its components might be operator configurable using application(s) including computer code to run using processor system 17, which may be implemented to include a central processing unit, which may include an Intel Pentium® processor or the like, and/or multiple processor units. Non-transitory computer-readable media can have instructions stored thereon/in, that can be executed by or used to program a computing device to perform any of the methods of the implementations described herein. Computer program code 26 implementing instructions for operating and configuring system 16 to intercommunicate and to process web pages, applications and other data and media content as described herein is preferably downloadable and stored on a hard disk, but the entire program code, or portions thereof, may also be stored in any other volatile or non-volatile memory medium or device as is well known, such as a ROM or RAM, or provided on any media capable of storing program code, such as any type of rotating media including floppy disks, optical discs, digital versatile disk (DVD), compact disk (CD), microdrive, and magneto-optical disks, and magnetic or optical cards, nanosystems (including molecular memory ICs), or any other type of computer-readable medium or device suitable for storing instructions and/or data. Additionally, the entire program code, or portions thereof, may be transmitted and downloaded from a software source over a transmission medium, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known. It will also be appreciated that computer code for the disclosed implementations can be realized in any programming language that can be executed on a client system and/or server or server system such as, for example, C, C++, HTML, any other markup language, Java™, JavaScript, ActiveX, any other scripting language, such as VBScript, and many other programming languages as are well known may be used. (Java™ is a trademark of Sun Microsystems, Inc.).

According to some implementations, each system 16 is configured to provide web pages, forms, applications, data and media content to user (client) systems 12 to support the access by user systems 12 as tenants of system 16. As such, system 16 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS could include one or more logically and/or physically connected servers distributed locally or across one or more geographic locations. Additionally, the term "server" is meant to refer to one type of computing device such as a system including processing hardware and process space(s), an associated storage medium such as a memory device or database, and, in some instances, a database application (e.g., OODBMS or RDBMS) as is well known in the art. It should also be understood that "server system" and "server" are often used interchangeably herein. Similarly, the database objects described herein can be implemented as single databases, a distributed database, a collection of distributed databases, a database with redundant online or offline backups or other redundancies, etc., and might include a distributed database or storage network and associated processing intelligence.

Figure 8B:
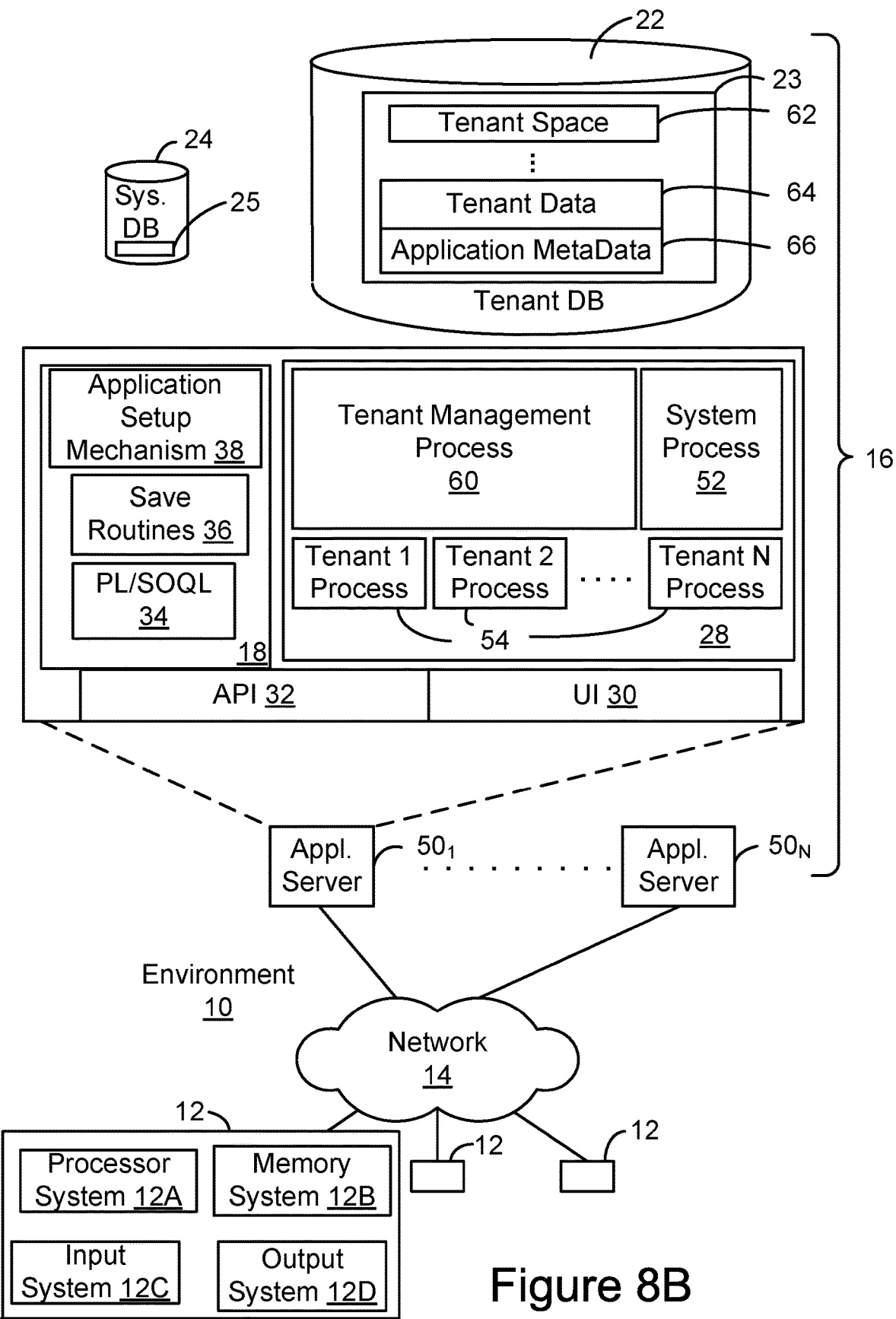
FIG. 8B shows a block diagram of an example of some implementations of elements of FIG. 8A and various possible interconnections between these elements.

FIG. 8B shows a block diagram of an example of some implementations of elements of FIG. 8A and various possible interconnections between these elements. That is, FIG. 8B also illustrates environment 10. However, in FIG. 8B elements of system 16 and various interconnections in some implementations are further illustrated. FIG. 8B shows that user system 12 may include processor system 12A, memory system 12B, input system 12C, and output system 12D. FIG. 8B shows network 14 and system 16. FIG. 8B also shows that system 16 may include tenant data storage 22, tenant data 23, system data storage 24, system data 25, User Interface (UI) 30, Application Program Interface (API) 32, PL/SOQL 34, save routines 36, application setup mechanism 38, application servers $50_1$-$50_N$, system process space 52, tenant process spaces 54, tenant management process space 60, tenant storage space 62, user storage 64, and application metadata 66. In other implementations, environment 10 may not have the same elements as those listed above and/or may have other elements instead of, or in addition to, those listed above.

User system 12, network 14, system 16, tenant data storage 22, and system data storage 24 were discussed above in FIG. 8A. Regarding user system 12, processor system 12A may be any combination of one or more processors. Memory system 12B may be any combination of one or more memory devices, short term, and/or long term memory. Input system 12C may be any combination of input devices, such as one or more keyboards, mice, trackballs, scanners, cameras, and/or interfaces to networks. Output system 12D may be any combination of output devices, such as one or more monitors, printers, and/or interfaces to networks. As shown by FIG. 8B, system 16 may include a network interface 20 (of FIG. 8A) implemented as a set of application servers 50, an application platform 18, tenant data storage 22, and system data storage 24. Also shown is system process space 52, including individual tenant process spaces 54 and a tenant management process space 60. Each application server 50 may be configured to communicate with tenant data storage 22 and the tenant data 23 therein, and system data storage 24 and the system data 25 therein to serve requests of user systems 12. The tenant data 23 might be divided into individual tenant storage spaces 62, which can be either a physical arrangement and/or a logical arrangement of data. Within each tenant storage space 62, user storage 64 and application metadata 66 might be similarly allocated for each user. For example, a copy of a user's most recently used (MRU) items might be stored to user storage 64. Similarly, a copy of MRU items for an entire organization that is a tenant might be stored to tenant storage space 62. A UI 30 provides a user interface and an API 32 provides an application programmer interface to system 16 resident processes to users and/or developers at user systems 12. The tenant data and the system data may be stored in various databases, such as one or more Oracle® databases.

Application platform 18 includes an application setup mechanism 38 that supports application developers' creation and management of applications, which may be saved as metadata into tenant data storage 22 by save routines 36 for execution by subscribers as one or more tenant process spaces 54 managed by tenant management process 60 for example. Invocations to such applications may be coded using PL/SOQL 34 that provides a programming language style interface extension to API 32. A detailed description of some PL/SOQL language implementations is discussed in commonly assigned U.S. Pat. No. 7,730,478, titled METHOD AND SYSTEM FOR ALLOWING ACCESS TO DEVELOPED APPLICATIONS VIA A MULTI-TENANT ON-DEMAND DATABASE SERVICE, by Craig Weissman, issued on Jun. 1, 2010, and hereby incorporated by reference in its entirety and for all purposes. Invocations to applications may be detected by one or more system processes, which manage retrieving application metadata 66 for the subscriber making the invocation and executing the metadata as an application in a virtual machine.

Each application server 50 may be communicably coupled to database systems, e.g., having access to system data 25 and tenant data 23, via a different network connection. For example, one application server $50_1$ might be coupled via the network 14 (e.g., the Internet), another application server $50_{N-1}$ might be coupled via a direct network link, and another application server $50_N$ might be coupled by yet a different network connection. Transfer Control Protocol and Internet Protocol (TCP/IP) are typical protocols for communicating between application servers 50 and the database system. However, it will be apparent to one skilled in the art that other transport protocols may be used to optimize the system depending on the network interconnect used.

In certain implementations, each application server 50 is configured to handle requests for any user associated with any organization that is a tenant. Because it is desirable to be able to add and remove application servers from the server pool at any time for any reason, there is preferably no server affinity for a user and/or organization to a specific application server 50. In one implementation, therefore, an interface system implementing a load balancing function (e.g., an F5 Big-IP load balancer) is communicably coupled between the application servers 50 and the user systems 12 to distribute requests to the application servers 50. In one implementation, the load balancer uses a least connections algorithm to route user requests to the application servers 50. Other examples of load balancing algorithms, such as round robin and observed response time, also can be used. For example, in certain implementations, three consecutive requests from the same user could hit three different application servers 50, and three requests from different users could hit the same application server 50. In this manner, by way of example, system 16 is multi-tenant, wherein system 16 handles storage of, and access to, different objects, data and applications across disparate users and organizations.

As an example of storage, one tenant might be a company that employs a sales force where each salesperson uses system 16 to manage their sales process. Thus, a user might maintain contact data, leads data, customer follow-up data, performance data, goals and progress data, etc., all applicable to that user's personal sales process (e.g., in tenant data storage 22). In an example of a MTS arrangement, since all of the data and the applications to access, view, modify, report, transmit, calculate, etc., can be maintained and accessed by a user system having nothing more than network access, the user can manage his or her sales efforts and cycles from any of many different user systems. For example, if a salesperson is visiting a customer and the customer has Internet access in their lobby, the salesperson can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by system 16 that are allocated at the tenant level while other data structures might be managed at the user level. Because an MTS might support multiple tenants including possible competitors, the MTS should have security protocols that keep data, applications, and application use separate. Also, because many tenants may opt for access to an MTS rather than maintain their own system, redundancy, up-time, and backup are additional functions that may be implemented in the MTS. In addition to user-specific data and tenant-specific data, system 16 might also maintain system level data usable by multiple tenants or other data. Such system level data might include industry reports, news, postings, and the like that are sharable among tenants.

In certain implementations, user systems 12 (which may be client systems) communicate with application servers 50 to request and update system-level and tenant-level data from system 16 that may involve sending one or more queries to tenant data storage 22 and/or system data storage 24. System 16 (e.g., an application server 50 in system 16) automatically generates one or more SQL statements (e.g., one or more SQL queries) that are designed to access the desired information. System data storage 24 may generate query plans to access the requested data from the database.

Each database can generally be viewed as a collection of objects, such as a set of logical tables, containing data fitted into predefined categories. A "table" is one representation of a data object, and may be used herein to simplify the conceptual description of objects and custom objects according to some implementations. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for case, account, contact, lead, and opportunity data objects, each containing pre-defined fields. It should be understood that the word "entity" may also be used interchangeably herein with "object" and "table".

In some multi-tenant database systems, tenants may be allowed to create and store custom objects, or they may be allowed to customize standard entities or objects, for example by creating custom fields for standard objects, including custom index fields. Commonly assigned U.S. Pat. No. 7,779,039, titled CUSTOM ENTITIES AND FIELDS IN A MULTI-TENANT DATABASE SYSTEM, by Weissman et al., issued on Aug. 17, 2010, and hereby incorporated by reference in its entirety and for all purposes, teaches systems and methods for creating custom objects as well as customizing standard objects in a multi-tenant database system. In certain implementations, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

Figure 9A:
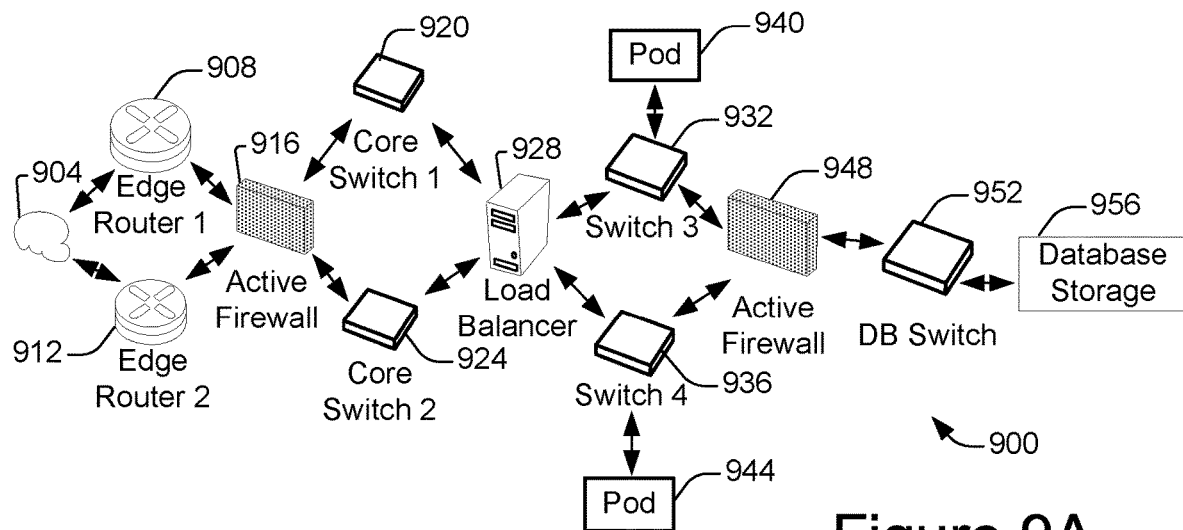
FIG. 9A shows a system diagram of an example of architectural components of an on-demand database service environment 900, in accordance with some implementations.

FIG. 9A shows a system diagram of an example of architectural components of an on-demand database service environment 900, in accordance with some implementations. A client machine located in the cloud 904, generally referring to one or more networks in combination, as described herein, may communicate with the on-demand database service environment via one or more edge routers 908 and 912. A client machine can be any of the examples of user systems 12 described above. The edge routers may communicate with one or more core switches 920 and 924 via firewall 916. The core switches may communicate with a load balancer 928, which may distribute server load over different pods, such as the pods 940 and 944. The pods 940 and 944, which may each include one or more servers and/or other computing resources, may perform data processing and other operations used to provide on-demand services. Communication with the pods may be conducted via pod switches 932 and 936. Components of the on-demand database service environment may communicate with a database storage 956 via a database firewall 948 and a database switch 952.

As shown in FIGS. 8A and 8B, accessing an on-demand database service environment may involve communications transmitted among a variety of different hardware and/or software components. Further, the on-demand database service environment 900 is a simplified representation of an actual on-demand database service environment. For example, while only one or two devices of each type are shown in FIGS. 8A and 8B, some implementations of an on-demand database service environment may include anywhere from one to many devices of each type. Also, the on-demand database service environment need not include each device shown in FIGS. 8A and 8B, or may include additional devices not shown in FIGS. 8A and 8B.

Moreover, one or more of the devices in the on-demand database service environment 900 may be implemented on the same physical device or on different hardware. Some devices may be implemented using hardware or a combination of hardware and software. Thus, terms such as "data processing apparatus," "machine," "server" and "device" as used herein are not limited to a single hardware device, but rather include any hardware and software configured to provide the described functionality.

The cloud 904 is intended to refer to a data network or combination of data networks, often including the Internet. Client machines located in the cloud 904 may communicate with the on-demand database service environment to access services provided by the on-demand database service environment. For example, client machines may access the on-demand database service environment to retrieve, store, edit, and/or process information.

In some implementations, the edge routers 908 and 912 route packets between the cloud 904 and other components of the on-demand database service environment 900. The edge routers 908 and 912 may employ the Border Gateway Protocol (BGP). The BGP is the core routing protocol of the Internet. The edge routers 908 and 912 may maintain a table of IP networks or 'prefixes', which designate network reachability among autonomous systems on the Internet.

In one or more implementations, the firewall 916 may protect the inner components of the on-demand database service environment 900 from Internet traffic. The firewall 916 may block, permit, or deny access to the inner components of the on-demand database service environment 900 based upon a set of rules and other criteria. The firewall 916 may act as one or more of a packet filter, an application gateway, a stateful filter, a proxy server, or any other type of firewall.

In some implementations, the core switches 920 and 924 are high-capacity switches that transfer packets within the on-demand database service environment 900. The core switches 920 and 924 may be configured as network bridges that quickly route data between different components within the on-demand database service environment. In some implementations, the use of two or more core switches 920 and 924 may provide redundancy and/or reduced latency.

In some implementations, the pods 940 and 944 may perform the core data processing and service functions provided by the on-demand database service environment. Each pod may include various types of hardware and/or software computing resources. An example of the pod architecture is discussed in greater detail with reference to FIG. 9B.

In some implementations, communication between the pods 940 and 944 may be conducted via the pod switches 932 and 936. The pod switches 932 and 936 may facilitate communication between the pods 940 and 944 and client machines located in the cloud 904, for example via core switches 920 and 924. Also, the pod switches 932 and 936 may facilitate communication between the pods 940 and 944 and the database storage 956.

In some implementations, the load balancer 928 may distribute workload between the pods 940 and 944. Balancing the on-demand service requests between the pods may assist in improving the use of resources, increasing throughput, reducing response times, and/or reducing overhead. The load balancer 928 may include multilayer switches to analyze and forward traffic.

In some implementations, access to the database storage 956 may be guarded by a database firewall 948. The database firewall 948 may act as a computer application firewall operating at the database application layer of a protocol stack. The database firewall 948 may protect the database storage 956 from application attacks such as structure query language (SQL) injection, database rootkits, and unauthorized information disclosure.

In some implementations, the database firewall 948 may include a host using one or more forms of reverse proxy services to proxy traffic before passing it to a gateway router. The database firewall 948 may inspect the contents of database traffic and block certain content or database requests. The database firewall 948 may work on the SQL application level atop the TCP/IP stack, managing applications' connection to the database or SQL management interfaces as well as intercepting and enforcing packets traveling to or from a database network or application interface.

In some implementations, communication with the database storage 956 may be conducted via the database switch 952. The multi-tenant database storage 956 may include more than one hardware and/or software components for handling database queries. Accordingly, the database switch 952 may direct database queries transmitted by other components of the on-demand database service environment (e.g., the pods 940 and 944) to the correct components within the database storage 956.

In some implementations, the database storage 956 is an on-demand database system shared by many different organizations. The on-demand database service may employ a multi-tenant approach, a virtualized approach, or any other type of database approach. On-demand database services are discussed in greater detail with reference to FIGS. 9A and 9B.

Figure 9B:
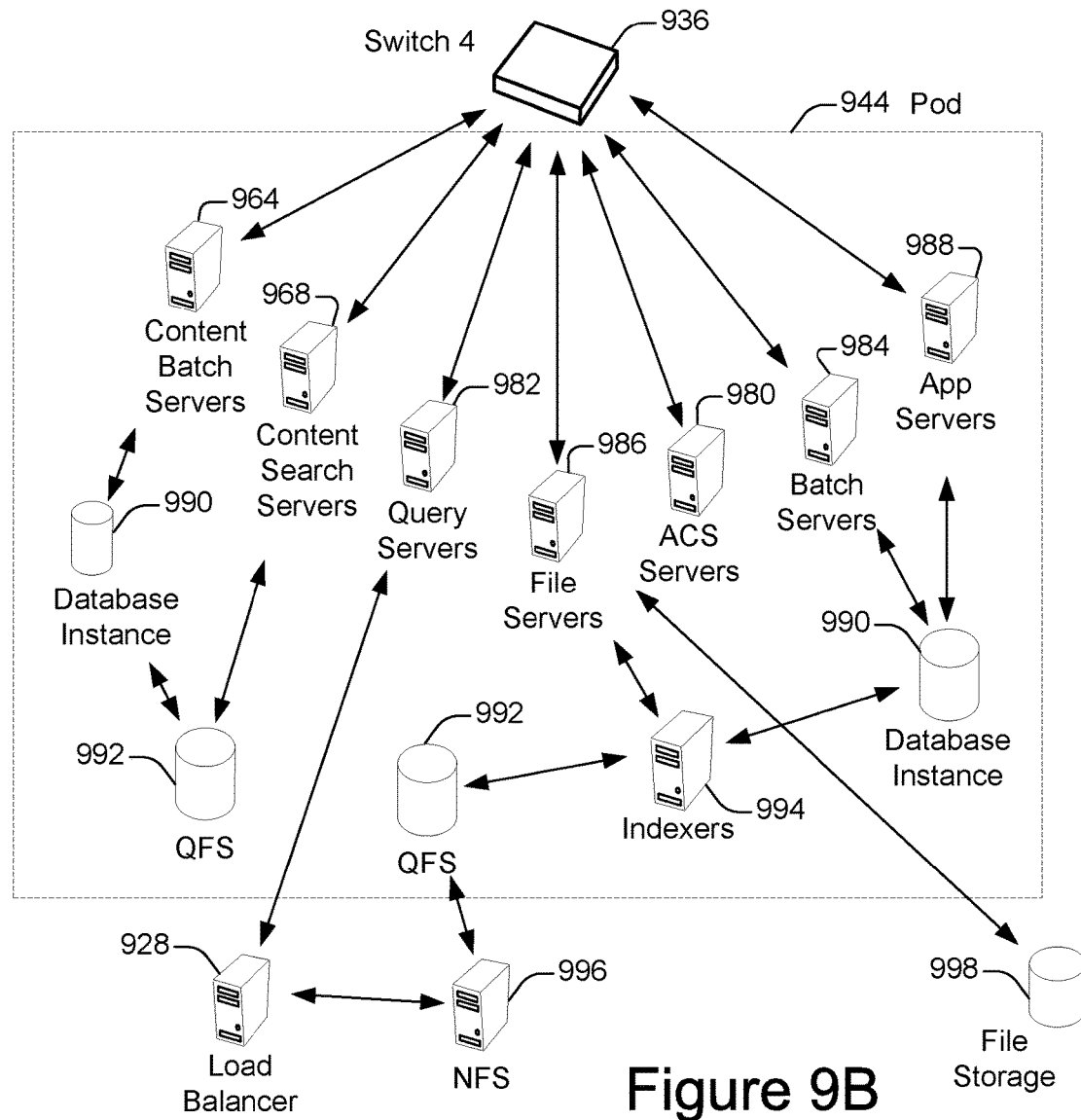
FIG. 9B shows a system diagram further illustrating an example of architectural components of an on-demand database service environment, in accordance with some implementations.

FIG. 9B shows a system diagram further illustrating an example of architectural components of an on-demand database service environment, in accordance with some implementations. The pod 944 may be used to render services to a user of the on-demand database service environment 900. In some implementations, each pod may include a variety of servers and/or other systems. The pod 944 includes one or more content batch servers 964, content search servers 968, query servers 982, file servers 986, access control system (ACS) servers 980, batch servers 984, and app servers 988. Also, the pod 944 includes database instances 990, quick file systems (QFS) 992, and indexers 994. In one or more implementations, some or all communication between the servers in the pod 944 may be transmitted via the switch 936.

The content batch servers 964 may handle requests internal to the pod. These requests may be long-running and/or not tied to a particular customer. For example, the content batch servers 964 may handle requests related to log mining, cleanup work, and maintenance tasks.

The content search servers 968 may provide query and indexer functions. For example, the functions provided by the content search servers 968 may allow users to search through content stored in the on-demand database service environment.

The file servers 986 may manage requests for information stored in the file storage 998. The file storage 998 may store information such as documents, images, and basic large objects (BLOBs). By managing requests for information using the file servers 986, the image footprint on the database may be reduced.

The query servers 982 may be used to retrieve information from one or more file systems. For example, the query system 982 may receive requests for information from the app servers 988 and then transmit information queries to the NFS 996 located outside the pod.

The pod 944 may share a database instance 990 configured as a multi-tenant environment in which different organizations share access to the same database. Additionally, services rendered by the pod 944 may call upon various hardware and/or software resources. In some implementations, the ACS servers 980 may control access to data, hardware resources, or software resources.

In some implementations, the batch servers 984 may process batch jobs, which are used to run tasks at specified times. Thus, the batch servers 984 may transmit instructions to other servers, such as the app servers 988, to trigger the batch jobs.

In some implementations, the QFS 992 may be an open source file system available from Sun Microsystems® of Santa Clara, Calif. The QFS may serve as a rapid-access file system for storing and accessing information available within the pod 944. The QFS 992 may support some volume management capabilities, allowing many disks to be grouped together into a file system. File system metadata can be kept on a separate set of disks, which may be useful for streaming applications where long disk seeks cannot be tolerated. Thus, the QFS system may communicate with one or more content search servers 968 and/or indexers 994 to identify, retrieve, move, and/or update data stored in the network file systems 996 and/or other storage systems.

In some implementations, one or more query servers 982 may communicate with the NFS 996 to retrieve and/or update information stored outside of the pod 944. The NFS 996 may allow servers located in the pod 944 to access information to access files over a network in a manner similar to how local storage is accessed.

In some implementations, queries from the query servers 922 may be transmitted to the NFS 996 via the load balancer 928, which may distribute resource requests over various resources available in the on-demand database service environment. The NFS 996 may also communicate with the QFS 992 to update the information stored on the NFS 996 and/or to provide information to the QFS 992 for use by servers located within the pod 944.

In some implementations, the pod may include one or more database instances 990. The database instance 990 may transmit information to the QFS 992. When information is transmitted to the QFS, it may be available for use by servers within the pod 944 without using an additional database call.

In some implementations, database information may be transmitted to the indexer 994. Indexer 994 may provide an index of information available in the database 990 and/or QFS 992. The index information may be provided to file servers 986 and/or the QFS 992.

In some implementations, one or more application servers or other servers described above with reference to FIGS. 7A and 7B include a hardware and/or software framework configurable to execute procedures using programs, routines, scripts, etc. Thus, in some implementations, one or more of application servers $50_1$-$50_N$ of FIG. 8B can be configured to initiate performance of one or more of the operations described above by instructing another computing device to perform an operation. In some implementations, one or more application servers $50_1$-$50_N$ carry out, either partially or entirely, one or more of the disclosed operations. In some implementations, app servers 988 of FIG. 9B support the construction of applications provided by the on-demand database service environment 900 via the pod 944. Thus, an app server 988 may include a hardware and/or software framework configurable to execute procedures to partially or entirely carry out or instruct another computing device to carry out one or more operations disclosed herein. In alternative implementations, two or more app servers 988 may cooperate to perform or cause performance of such operations. Any of the databases and other storage facilities described above with reference to FIGS. 7A, 7B, 8A and 8B can be configured to store lists, articles, documents, records, files, and other objects for implementing the operations described above. For instance, lists of available communication channels associated with share actions for sharing a type of data item can be maintained in tenant data storage 22 and/or system data storage 24 of FIGS. 7A and 7B. By the same token, lists of default or designated channels for particular share actions can be maintained in storage 22 and/or storage 24. In some other implementations, rather than storing one or more lists, articles, documents, records, and/or files, the databases and other storage facilities described above can store pointers to the lists, articles, documents, records, and/or files, which may instead be stored in other repositories external to the systems and environments described above with reference to FIGS. 7A, 7B, 8A and 8B.

While some of the disclosed implementations may be described with reference to a system having an application server providing a front end for an on-demand database service capable of supporting multiple tenants, the disclosed implementations are not limited to multi-tenant databases nor deployment on application servers. Some implementations may be practiced using various database architectures such as ORACLE®, DB2® by IBM and the like without departing from the scope of the implementations claimed.

It should be understood that some of the disclosed implementations can be embodied in the form of control logic using hardware and/or computer software in a modular or integrated manner. Other ways and/or methods are possible using hardware and a combination of hardware and software.

Any of the disclosed implementations may be embodied in various types of hardware, software, firmware, and combinations thereof. For example, some techniques disclosed herein may be implemented, at least in part, by computer-readable media that include program instructions, state information, etc., for performing various services and operations described herein. Examples of program instructions include both machine code, such as produced by a compiler, and files containing higher-level code that may be executed by a computing device such as a server or other data processing apparatus using an interpreter. Examples of computer-readable media include, but are not limited to: magnetic media such as hard disks, floppy disks, and magnetic tape; optical media such as flash memory, compact disk (CD) or digital versatile disk (DVD); magneto-optical media; and hardware devices specially configured to store program instructions, such as read-only memory (ROM) devices and random access memory (RAM) devices. A computer-readable medium may be any combination of such storage devices.

Any of the operations and techniques described in this application may be implemented as software code to be executed by a processor using any suitable computer language such as, for example, Java, C++ or Perl using, for example, object-oriented techniques. The software code may be stored as a series of instructions or commands on a computer-readable medium. Computer-readable media encoded with the software/program code may be packaged with a compatible device or provided separately from other devices (e.g., via Internet download). Any such computer-readable medium may reside on or within a single computing device or an entire computer system, and may be among other computer-readable media within a system or network. A computer system or computing device may include a monitor, printer, or other suitable display for providing any of the results mentioned herein to a user.

While various implementations have been described herein, it should be understood that they have been presented by way of example only, and not limitation. Thus, the breadth and scope of the present application should not be limited by any of the implementations described herein, but should be defined only in accordance with the following and later-submitted claims and their equivalents.

What is claimed is:

1. A non-transitory computer readable medium comprising computer-readable program code configured to be executed by one or more processors when retrieved from the non-transitory computer-readable medium, the program code comprising computer-readable instructions to cause:

identifying a data object stored on a mobile device, the data object including a list of action items wherein each one of the action items comprises a separate entry within the data object;

categorizing a first action item in a first category of a plurality of categories based, at least in part, on content of the list of actions items, wherein the first category is an outdoor activity;

identifying a verb within content of the first action item as an action term; and identifying a time period for completion of the first action item;

identifying, at least partially based on the category of the first action item, the identified action term, and the identified time period for completion of the first action item, an associated application from a plurality of candidate applications within the mobile device;

generating a data request including at least the identified time period, for the associated application, wherein the data request comprises a request for outdoor conditions for accomplishing the first action item within the time period;

causing the associated application on the mobile device to provide, via a network, the data request associated with the object;

receiving, with the associated application, reply data associated with the data request, wherein the reply data comprises data indicating the outdoor conditions during the time period;

determining, from the reply data indicating the outdoor conditions during the time period, an optimal time period for performance of the first action item;

generating, based on the optimal time period, a notification comprising performance instructions indicating the optimal time period for performance of the first action item; and providing at least one user interface element for display at the mobile device, the user interface element including the notification.

2. The non-transitory computer readable medium as recited in claim 1, the program code comprising instructions further configured to cause:

processing an indication of a user selection of one of a set of list notification options, the set of list notification options including an opt-in option indicating a request to opt-in to automated notification generation pertaining to lists of action items stored on the mobile device and an opt-out option indicating a request to opt-out of automated notification generation pertaining to lists of action items stored on the mobile device;

responsive to processing the indication of the user selection of one of the set of list notification options, updating a profile stored on the mobile device such that the profile indicates whether the user has opted-in to or opted-out of automated notification generation pertaining to lists of action items stored on the mobile device; and prior to generating the notification, determining from the profile stored on the mobile device that the user has opted-in to automated notification generation pertaining to lists of action items stored on the mobile device.

3. The non-transitory computer readable medium as recited in claim 1, the program code comprising instructions further configured to cause:

processing an indication of a user selection of the list of action items for automated notification generation;

responsive to processing the indication of the user selection of the list of action items for automated notification generation, updating a profile stored on the mobile device such that the profile indicates that the user has selected the list of action items for automated notification generation; and prior to generating the notification, determining from the profile stored on the mobile device that the user has opted-in to automated notification generation pertaining to the list of action items.

4. The non-transitory computer readable medium as recited in claim 1, wherein the generating the notification further comprises selecting one or a plurality of different notifications based on the reply data, and wherein the user interface element includes a drop-down menu or tabs.

5. The non-transitory computer readable medium as recited in claim 1; wherein the data request is provided to a weather forecasting service.

6. The non-transitory computer readable medium as recited in claim 1, wherein the determining the set of operations further comprises:

determining, from the reply data, a first condition associated with the first action item;

automatically determining a follow-on operation based on the first condition; and performing the follow-on operation, wherein the notification is further based on the follow-on operation.

7. The non-transitory computer readable medium as recited in claim 1, wherein the data object further comprises a title, and wherein the data request is determined further based on the title.

8. A method, comprising:

identifying a data object stored on a mobile device, the data object including a list of action items wherein each one of the action items comprises a separate entry within the data object;

categorizing a first action item in a first category of a plurality of categories, based, at least in part, on content of the list of actions items, wherein the first category is an outdoor activity;

identifying a verb within content of the first action item as an action term; and identifying a time period for completion of the first action item;

identifying, at least partially based on the category of the first action item, the identified action term, and the identified time period for completion of the first action item, an associated application from a plurality of candidate applications within the mobile device;

generating a data request including at least the identified time period, for the associated application, wherein the data request comprises a request for outdoor conditions for accomplishing the first action item within the time period;

causing the associated application on the mobile device to provide, via a network, the data request associated with the object;

receiving, with the associated application, reply data associated with the data request, wherein the reply data comprises data indicating the outdoor conditions during the time period;

determining, from the reply data indicating the outdoor conditions during the time period, an optimal time period for performance of the first action item;

generating, based on the optimal time period, a notification comprising performance instructions indicating the optimal time period for performance of the first action item; and providing at least one user interface element for display at the mobile device, the user interface element including the notification.

9. The method as recited in claim 8, further comprising:

processing an indication of a user selection of one of a set of list notification options, the set of list notification options including an opt-in option indicating a request to opt-in to automated notification generation pertaining to lists of action items stored on the mobile device and an opt-out option indicating a request to opt-out of automated notification generation pertaining to lists of action items stored on the mobile device;

responsive to processing the indication of the user selection of one of the set of list notification options, updating a profile stored on the mobile device such that the profile indicates whether the user has opted-in to or opted-out of automated notification generation pertaining to lists of action items stored on the mobile device; and prior to generating the notification, determining from the profile stored on the mobile device that the user has opted-in to automated notification generation pertaining to lists of action items stored on the mobile device.

10. The method as recited in claim 8, further comprising:

processing an indication of a user selection of the list of action items for automated notification generation;

responsive to processing the indication of the user selection of the list of action items for automated notification generation, updating a profile stored on the mobile device such that the profile indicates that the user has selected the list of action items for automated notification generation; and prior to generating the notification, determining from the profile stored on the mobile device that the user has opted-in to automated notification generation pertaining to the list of action items.

11. The method as recited in claim 8, wherein the generating the notification further comprises selecting one or a plurality of different notifications based on the reply data, and wherein the user interface element includes a drop-down menu or tabs.

12. The method as recited in claim 8, wherein the data request is provided to a weather forecasting service.

13. The method as recited in claim 8, further comprising:

determining, from the reply data, a first condition associated with the first action item;

automatically determining a follow-on operation based on the first condition; and performing the follow-on operation, wherein the notification is further based on the follow-on operation.

14. The method as recited in claim 8, wherein the data object further comprises a title, and wherein the data request is determined further based on the title.

15. A computing system, comprising:

One or more processors; and

A memory, the one or more processors to cause:

identifying a data object stored on a mobile device, the data object including a list of action items wherein each one of the action items comprises a separate entry within the data object;

categorizing a first action item in a first category of a plurality of categories, based, at least in part, on content of the list of actions items, wherein the first category is an outdoor activity;

identifying a verb within the content of the first action item as an action term; and identifying a time period for completion of the first action item;

identifying, at least partially based on the category of the first action item, the identified action term, and the identified time period for completion of the first action item, an associated application from a plurality of candidate applications within the mobile device;

generating a data request including at least the identified time period, for the associated application, wherein the data request comprises a request for outdoor conditions for accomplishing the first action item within the time period;

causing the associated application on the mobile device to provide, via a network, the data request associated with the object;

receiving, with the associated application, reply data associated with the data request, wherein the reply data comprises data indicating the outdoor conditions during the time period;

determining, from the reply data indicating the outdoor conditions during the time period, an optimal time period for performance of the first action item;

generating, based on the optimal time period, a notification comprising performance instructions indicating the optimal time period for performance of the first action item; and providing at least one user interface element for display at the mobile device, the user interface element including the notification.

16. The computing system as recited in claim 15, the one or more processors further configurable to cause:

processing an indication of a user selection of one of a set of list notification options, the set of list notification options including an opt-in option indicating a request to opt-in to automated notification generation pertaining to lists of action items stored on the mobile device and an opt-out option indicating a request to opt-out of automated notification generation pertaining to lists of action items stored in association with the user;

responsive to processing the indication of the user selection of one of the set of list notification options, updating a profile stored on the mobile device such that the profile indicates whether the user has opted-in to or opted-out of automated notification generation pertaining to lists of action items stored in association with the user; and prior to generating the notification, determining from the profile stored on the mobile device that the user has opted-in to automated notification generation pertaining to lists of action items stored in association with the user.

17. The computing system as recited in claim 15, the one or more processors further configurable to cause:

processing an indication of a user selection of the list of action items for automated notification generation;

responsive to processing the indication of the user selection of the list of action items for automated notification generation, updating a profile stored in association with the user such that the profile indicates that the user has selected the list of action items for automated notification generation; and prior to generating the notification, determining from the profile stored in association with the user that a user has opted-in to automated notification generation pertaining to the list of action items.

18. The computing system as recited in claim 15, wherein the data request is provided to a weather forecasting service.

19. The computing system as recited in claim 15, the one or more processors further configurable to cause:

determining, from the reply data, a first condition associated with the first action item;

automatically determining a follow-on operation based on the first condition; and performing the follow-on operation, wherein the notification is further based on the follow-on operation.

20. The computing system as recited in claim 15, wherein the data object further comprises a title, and wherein the data request is determined further based on the title.

* * * * *